United States Patent
Shah et al.

(10) Patent No.: US 12,232,112 B2
(45) Date of Patent: Feb. 18, 2025

(54) TRANSCEIVER DEVICE AND SCHEDULING DEVICE

(71) Applicant: Panasonic Intellectual Property Corporation of America, Torrance, CA (US)

(72) Inventors: Rikin Shah, Langen (DE); Ankit Bhamri, Rödermark (DE); Hidetoshi Suzuki, Kanagawa (JP); Ming-Hung Tao, Frankfurt am Main (DE); Akihiko Nishio, Osaka (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 274 days.

(21) Appl. No.: 17/630,478

(22) PCT Filed: Jun. 10, 2020

(86) PCT No.: PCT/EP2020/066044
§ 371 (c)(1),
(2) Date: Jan. 26, 2022

(87) PCT Pub. No.: WO2021/023416
PCT Pub. Date: Feb. 11, 2021

(65) Prior Publication Data
US 2022/0264616 A1    Aug. 18, 2022

(30) Foreign Application Priority Data
Aug. 2, 2019 (EP) .................................... 19189862

(51) Int. Cl.
*H04W 72/1273* (2023.01)
*H04L 1/08* (2006.01)
*H04W 72/23* (2023.01)

(52) U.S. Cl.
CPC .......... *H04W 72/1273* (2013.01); *H04L 1/08* (2013.01); *H04W 72/23* (2023.01)

(58) Field of Classification Search
CPC ....... H04L 1/1887; H04L 1/1896; H04L 1/08; H04L 1/1848; H04L 1/1822
See application file for complete search history.

(56) References Cited

U.S. PATENT DOCUMENTS

| 8,305,961 B2 | 11/2012 | Kuo |
| 9,730,204 B2 | 8/2017 | Yi et al. |

(Continued)

FOREIGN PATENT DOCUMENTS

| CN | 103947278 A | 7/2014 |
| CN | 105340341 A | 2/2016 |

(Continued)

OTHER PUBLICATIONS

3GPP, "3rd Generation Partnership Project; Technical Specification Group Radio Access Network; NR; Medium Access Control (MAC) protocol specification (Release 15)," 3GPP TS 38.321 V15.6.0, Jun. 2019. (78 pages).

(Continued)

*Primary Examiner* — Chi Ho A Lee
(74) *Attorney, Agent, or Firm* — Seed IP Law Group LLP

(57) ABSTRACT

The present disclosure provides a transceiver device and a scheduling device, and communication methods for transceiver device and scheduling device. The transceiver device comprises a transceiver, which, in operation, receives control information over a Physical Downlink Control Channel, PDCCH, the control information indicating a scheduled transmission of data; and circuitry, which, in operation, sets a monitoring period according to a number of blind retransmissions of the data, wherein the transceiver, in operation, monitors the PDCCH during the monitoring period.

15 Claims, 18 Drawing Sheets

(56) References Cited

U.S. PATENT DOCUMENTS

| | | | |
|---|---|---|---|
| 9,942,941 | B2 | 4/2018 | Rathonyi et al. |
| 10,020,917 | B2 | 7/2018 | Lee et al. |
| 10,582,452 | B2 | 3/2020 | Wu et al. |
| 10,798,773 | B2 | 10/2020 | Rathonyi et al. |
| 10,819,474 | B2 | 10/2020 | Zhang et al. |
| 11,470,680 | B2 | 10/2022 | Rathonyi et al. |
| 12,010,623 | B2 | 6/2024 | Hofstrom |
| 2014/0086110 | A1 | 3/2014 | Lee et al. |
| 2014/0226575 | A1 | 8/2014 | Davydov et al. |
| 2015/0181571 | A1 | 6/2015 | Park et al. |
| 2016/0007374 | A1 | 1/2016 | Lee et al. |
| 2016/0242231 | A1* | 8/2016 | Vajapeyam ............ H04W 24/08 |
| 2016/0261391 | A1 | 9/2016 | Chen et al. |
| 2017/0150367 | A1* | 5/2017 | Han .................... H04L 27/0006 |
| 2018/0123767 | A1 | 5/2018 | Islam et al. |
| 2018/0332533 | A1* | 11/2018 | Bhattad ............. H04W 52/0235 |
| 2019/0044663 | A1 | 2/2019 | Rosa et al. |
| 2020/0106498 | A1* | 4/2020 | Zhou ..................... H04W 16/28 |
| 2020/0128578 | A1* | 4/2020 | Park ...................... H04L 1/1812 |
| 2020/0314745 | A1* | 10/2020 | Yi ......................... H04L 1/1893 |
| 2021/0014823 | A1* | 1/2021 | Takeda .................. H04W 72/23 |
| 2021/0021380 | A1* | 1/2021 | Nguyen ................ H04L 1/1607 |
| 2021/0022121 | A1* | 1/2021 | Lin ....................... H04L 1/0045 |
| 2022/0248448 | A1* | 8/2022 | Lin ....................... H04L 1/1896 |
| 2022/0368468 | A1* | 11/2022 | Xiong ................... H04W 76/27 |
| 2022/0376827 | A1* | 11/2022 | Seo ....................... H04L 1/1825 |

FOREIGN PATENT DOCUMENTS

| | | |
|---|---|---|
| CN | 108476471 A | 8/2018 |
| CN | 109952779 A | 6/2019 |
| JP | 2009171581 A | 7/2009 |
| JP | 2017017633 A | 1/2017 |
| JP | 2018527863 A | 9/2018 |
| JP | 2019505120 A | 2/2019 |
| JP | 2019513321 A | 5/2019 |
| WO | 2017157181 A1 | 9/2017 |
| WO | 2018229326 A1 | 12/2018 |
| WO | 2019016952 A1 | 1/2019 |
| WO | 2019032087 A1 | 2/2019 |

OTHER PUBLICATIONS

3GPP, "3rd Generation Partnership Project; Technical Specification Group Radio Access Network; Nr; Nr and NG-RAN Overall Description; Stage 2 (Release 15)," 3GPP TS 38.300 V15.6.0, Jun. 2019. (99 pages).

3GPP, "3rd Generation Partnership Project; Technical Specification Group Radio Access Network; NR; User Equipment (UE) procedures in Idle mode and RRC Inactive state (Release 15)," 3GPP TS 38.304 V15.4.0, Jun. 2019. (29 pages).

3GPP, "3rd Generation Partnership Project; Technical Specification Group Radio Access Network; NR; Physical channels and modulation (Release 15)," 3GPP TS 38.211 V15.6.0, Jun. 2019. (97 pages).

3GPP, "3rd Generation Partnership Project; Technical Specification Group Radio Access Network; Solutions for NR to support non-terrestrial networks (NTN) (Release 16)," 3GPP TR 38.821 V0.3.0, Nov. 2018. (34 pages).

3GPP, "3rd Generation Partnership Project; Technical Specification Group Radio Access Network; Study on new radio access technology: Radio access architecture and interfaces (Release 14)," 3GPP TR 38.801 V14.0.0, Mar. 2017. (91 pages).

3GPP, "3rd Generation Partnership Project; Technical Specification Group Radio Access Network; Study on New Radio (NR) to support non terrestrial networks (Release 15)," 3GPP TR 38.811 V15.0.0, Jun. 2018. (119 pages).

3GPP, "3rd Generation Partnership Project; Technical Specification Group Radio Access Network; Study on Scenarios and Requirements for Next Generation Access Technologies; (Release 15)," 3GPP TR 38.913 V15.0.0, Jun. 2018. (39 pages).

3GPP, "3rd Generation Partnership Project; Technical Specification Group Services and System Aspects; System Architecture for the 5G System; Stage 2 (Release 16)," 3GPP TS 23.501 V16.1.0, Jun. 2019. (368 pages).

Extended European Search Report, dated Jan. 24, 2020, for European Application No. 19189862.6-1205. (7 pages).

International Search Report, mailed Sep. 10, 2020, for International Application No. PCT/EP2020/066044. (2 pages).

Nokia, Nokia Shanghai Bell, "On the PDCCH enhancements for NR URLLC," R1-1900927, Agenda Item: 7.2.6.1.1, 3GPP TSG-RAN WG1 Ad-Hoc Meeting 1901, Taipei, Taiwan, Jan. 21-24, 2019. (15 pages).

3GPP, "3rd Generation Partnership Project; Technical Specification Group Radio Access Network; Evolved Universal Terrestrial Radio Access (E-UTRA) and Evolved Packet Core (EPC); User Equipment (UE) conformance specification; Part 1: Protocol conformance specification (Release 13)," 3GPP TS 36.523-1 V13.3.0, Dec. 2016, 5440 pages.

Abreu et al., "A Blind Retransmission Scheme for Ultra-Reliable and Low Latency Communications," 2018 IEEE 87th Vehicular Technology Conference, VTC Spring 2018—Proceedings, 6 pages.

Amir C, "LTE resource scheduling (7)-DRX discontinuous reception (1)," CSDN blog, Published: Sep. 20, 2016, https://blog.csdn.net/m_052148/article/details/52439789, 5 pages.

Chinese Office Action dated Sep. 4, 2023, for the corresponding Chinese Patent Application No. 202080052073.9, 15 pages. (With English Translation).

MCC Support, "Final Report of 3GPP TSG RAN WG1 #98 v.2.0.0; (Prague, Czech Rep, Aug. 26-30, 2019)," R1-1911429, 3GPP TSG RAN WGI Meeting #98bis, Chongqing, China, Oct. 14-18, 2019, 233 pages.

Japanese Notice of Reasons for Refusal, dated May 14, 2024, for Japanese Patent Application No. 2022-506653. (12 pages) (with English translation).

Chinese Notice of Allowance, issued Feb. 29, 2024, for Chinese Patent Application No. 202080052073.9. (7 pages) (with English translation).

Japanese Notice of Reasons for Rejection dated Nov. 26, 2024, for Japanese Patent Application No. 2022-506653. (6 pages) (With English Translation).

Ericsson, "On switching off HARQ for NTN," Tdoc R2-1907297, Agenda Item: 11.6.3.1, 3GPP TSG-RAN WG2 #106, Reno, Nevada, US, May 13-17, 2019. (6 pages).

Huawei, HiSilicon, "Discussion on disabling HARQ in NTN," R2-1907842, Resubmission of R2-1904161, Agenda Item: 11.6.3.1, 3GPP TSG-RAN WG2 Meeting #106, Reno, USA, May 13-17, 2019. (3 pages).

Huawei, HiSilicon, "Discussion on HARQ feedback enable and disable," R2-1907416, Agenda Item: 11.4.2, 3GPP TSG-RAN WG2 #106, Reno, USA, May 13-17, 2019. (5 pages).

LG Electronics Inc., "Discussion on DRX operation associated with disabling Harq," R2- 1907837, Resubmission of R2-1904927, Agenda Item: 11.6.3.1, 3GPP TSG-RAN WG2 Meeting #106, Reno, USA, May 13-17, 2019. (2 pages).

MediaTek Inc., "Implications of Supporting HARQ in NTN," Tdoc R2-1905703, Agenda Item: 11.6.3.1, 3GPP TSG-RAN WG2 Meeting #106, Reno, USA, May 13-17, 2019. (3 pages).

Nomor Research GmbH et al., "HARQ Options for NTN," R2-1908247, Agenda Item: 11.6.3.1, 3GPP TSG-RAN WG2 Meeting #106, Reno, USA, May 13-17, 2019. (2 pages).

OPPO, "Left issues on HARQ configuration for NTN," R2-1905579, Agenda Item: 11.6.3.1, 3GPP TSG-RAN WG2 Meeting #106, Reno, US, May 13-17, 2019. (2 pages).

ZTE Corporation, Sanechips, "Consideration on HARQ for NTN," R2-1906115, Revision of R2-1903392, Agenda Item: 11.6.3.1, 3GPP TSG RAN WG2 Meeting #106, Reno, USA, May 13-17, 2019. (5 pages).

ZTE Corporation, Sanechips, "Impact of HARQ on DRX," R2-1906117, Agenda Item: 11.6.3.1, 3GPP TSG RAN WG2 Meeting #106, Reno, USA, May 13-17, 2019. (7 pages).

* cited by examiner

TRANSCEIVER DEVICE AND SCHEDULING DEVICE

BACKGROUND

Technical Field

The present disclosure relates to transmission and reception of signals in a communication system. In particular, the present disclosure relates to methods and apparatuses for such transmission and reception.

Description of the Related Art

Currently, the 3rd Generation Partnership Project (3GPP) works at the technical specifications for the next generation cellular technology, which is also called fifth generation (5G).

One objective is to provide a single technical framework addressing all usage scenarios, requirements and deployment scenarios (see, e.g., section 6 of TR 38.913 version 15.0.0), at least including enhanced mobile broadband (eMBB), ultra-reliable low-latency communications (URLLC), massive machine type communication (mMTC). For example, eMBB deployment scenarios may include indoor hotspot, dense urban, rural, urban macro and high speed; URLLC deployment scenarios may include industrial control systems, mobile health care (remote monitoring, diagnosis and treatment), real time control of vehicles, wide area monitoring and control systems for smart grids; mMTC deployment scenarios may include scenarios with large number of devices with non-time critical data transfers such as smart wearables and sensor networks. The services eMBB and URLLC are similar in that they both demand a very broad bandwidth, however are different in that the URLLC service may preferably require ultra-low latencies.

A second objective is to achieve forward compatibility. Backward compatibility to Long Term Evolution (LTE, LTE-A) cellular systems is not required, which facilitates a completely new system design and/or the introduction of novel features.

BRIEF SUMMARY

One non-limiting and exemplary embodiment facilitates providing improved procedures for facilitating to save UE power, including procedures involving monitoring of a downlink control channel.

In an embodiment, the techniques disclosed herein feature a transceiver device, comprising a transceiver, which, in operation, receives control information over a Physical Downlink Control Channel, PDCCH, the control information indicating a scheduled transmission of data; and circuitry, which, in operation, sets a monitoring period according to a number of blind retransmissions of the data, wherein the transceiver, in operation, monitors the PDCCH during the monitoring period.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE SEVERAL VIEWS OF THE DRAWINGS

In the following, exemplary embodiments are described in more detail with reference to the attached figures and drawings.

DETAILED DESCRIPTION

5G NR System Architecture and Protocol Stacks

3GPP has been working at the next release for the 5th generation cellular technology, simply called 5G, including the development of a new radio access technology (NR) operating in frequencies ranging up to 100 GHz. The first version of the 5G standard was completed at the end of 2017, which allows proceeding to 5G NR standard-compliant trials and commercial deployments of smartphones.

Figure 1:
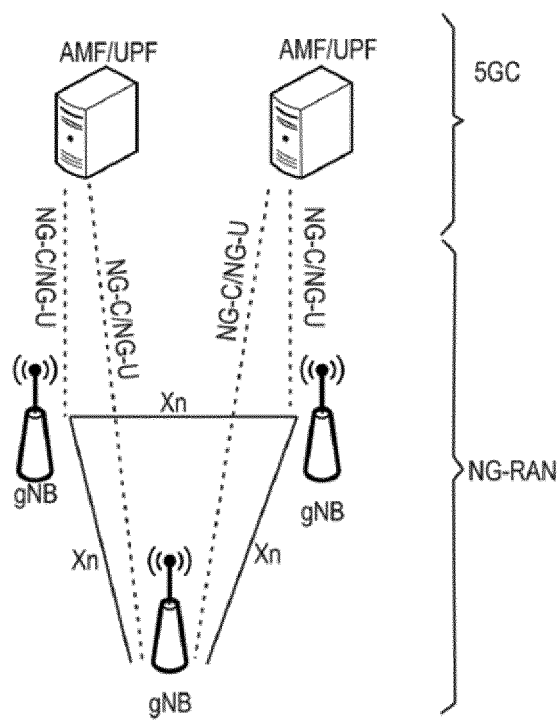
FIG. 1 shows an exemplary architecture for a 3GPP NR system.

Among other things, the overall system architecture assumes an NG-RAN (Next Generation-Radio Access Network) that comprises gNBs, providing the NG-radio access user plane (SDAP/PDCP/RLC/MAC/PHY) and control plane (RRC) protocol terminations towards the UE. The gNBs are interconnected with each other by means of the Xn interface. The gNBs are also connected by means of the Next Generation (NG) interface to the NGC (Next Generation Core), more specifically to the AMF (Access and Mobility Management Function) (e.g., a particular core entity performing the AMF) by means of the NG-C interface and to the UPF (User Plane Function) (e.g., a particular core entity performing the UPF) by means of the NG-U interface. The NG-RAN architecture is illustrated in FIG. 1 (see, e.g., 3GPP TS 38.300 v15.6.0, section 4).

Figure 2:
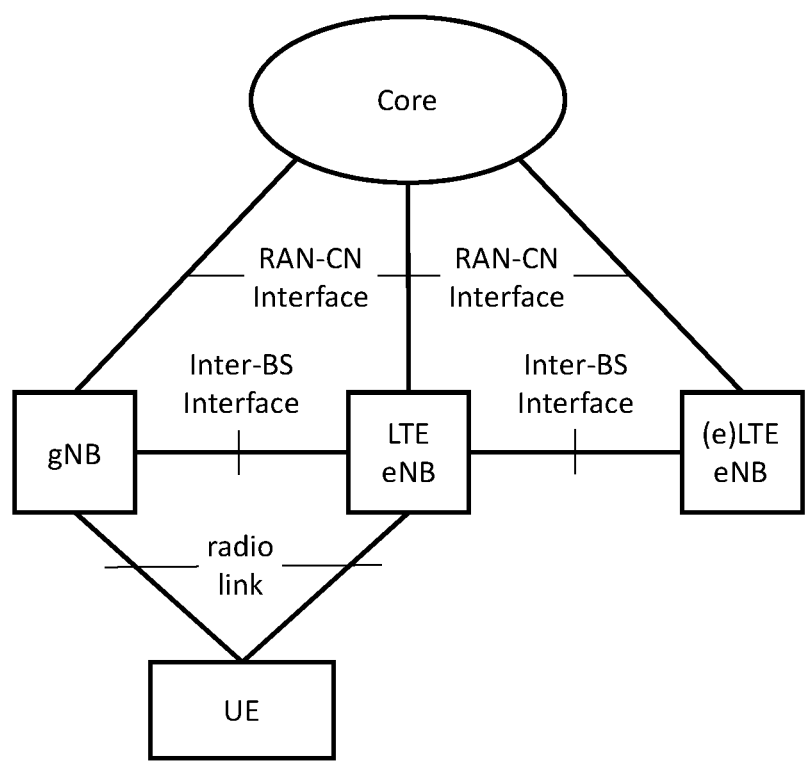
FIG. 2 shows an exemplary user and control plane architecture for the LTE eNB, gNB, and UE.

Various different deployment scenarios can be supported (see, e.g., 3GPP TR 38.801 v14.0.0). For instance, a non-centralized deployment scenario (see, e.g., section 5.2 of TR 38.801; a centralized deployment is illustrated in section 5.4) is presented therein, where base stations supporting the 5G NR can be deployed. FIG. 2 illustrates an exemplary non-centralized deployment scenario (see, e.g., FIG. 5.2.-1 of said TR 38.801), while additionally illustrating an LTE eNB as well as a user equipment (UE) that is connected to both a gNB and an LTE eNB. The new eNB for NR 5G may be exemplarily called gNB. An eLTE eNB is the evolution of an eNB that supports connectivity to the EPC (Evolved Packet Core) and the NGC (Next Generation Core).

The user plane protocol stack for NR (see, e.g., 3GPP TS 38.300, section 4.4.1) comprises the PDCP (Packet Data Convergence Protocol, see section 6.4 of TS 38.300), RLC (Radio Link Control, see section 6.3 of TS 38.300) and MAC (Medium Access Control, see section 6.2 of TS 38.300) sublayers, which are terminated in the gNB on the network side. Additionally, a new access stratum (AS) sublayer (SDAP, Service Data Adaptation Protocol) is introduced above PDCP (see, e.g., sub-clause 6.5 of 3GPP TS 38.300). A control plane protocol stack is also defined for NR (see for instance TS 38.300, section 4.4.2). An overview of the Layer 2 functions is given in sub-clause 6 of TS 38.300. The functions of the PDCP, RLC and MAC sublayers are listed respectively in sections 6.4, 6.3, and 6.2 of TS 38.300. The functions of the RRC layer are listed in sub-clause 7 of TS 38.300.

For instance, the Medium-Access-Control layer handles logical-channel multiplexing, and scheduling and scheduling-related functions, including handling of different numerologies.

The physical layer (PHY) is for example responsible for coding, PHY HARQ processing, modulation, multi-antenna processing, and mapping of the signal to the appropriate physical time-frequency resources. It also handles mapping of transport channels to physical channels. The physical layer provides services to the MAC layer in the form of transport channels. A physical channel corresponds to the set of time-frequency resources used for transmission of a particular transport channel, and each transport channel is mapped to a corresponding physical channel. One physical channel is the PRACH (Physical Random Access Channel) used for the random access.

Use cases/deployment scenarios for NR could include enhanced mobile broadband (eMBB), ultra-reliable low-latency communications (URLLC), massive machine type communication (mMTC), which have diverse requirements in terms of data rates, latency, and coverage. For example, eMBB is expected to support peak data rates (20 Gbps for downlink and 10 Gbps for uplink) and user-experienced data rates in the order of three times what is offered by IMT-Advanced. On the other hand, in case of URLLC, the tighter requirements are put on ultra-low latency (0.5 ms for UL and DL each for user plane latency) and high reliability (1-10-5 within 1 ms). Finally, mMTC may preferably require high connection density (1,000,000 devices/km2 in an urban environment), large coverage in harsh environments, and extremely long-life battery for low cost devices (15 years).

Therefore, the OFDM numerology (e.g., subcarrier spacing, OFDM symbol duration, cyclic prefix (CP) duration, number of symbols per scheduling interval) that is suitable for one use case might not work well for another. For example, low-latency services may preferably require a shorter symbol duration (and thus larger subcarrier spacing) and/or fewer symbols per scheduling interval (aka, TTI) than an mMTC service. Furthermore, deployment scenarios with large channel delay spreads may preferably require a longer CP duration than scenarios with short delay spreads. The subcarrier spacing should be optimized accordingly to retain the similar CP overhead. NR may support more than one value of subcarrier spacing. Correspondingly, subcarrier spacing of 15 kHz, 30 kHz, 60 kHz . . . are being considered at the moment. The symbol duration Tu and the subcarrier spacing $\Delta f$ are directly related through the formula $\Delta f=1/Tu$. In a similar manner as in LTE systems, the term "resource element" can be used to denote a minimum resource unit being composed of one subcarrier for the length of one OFDM/SC-FDMA symbol.

In the new radio system 5G-NR for each numerology and carrier a resource grid of subcarriers and OFDM symbols is defined respectively for uplink and downlink. Each element in the resource grid is called a resource element and is identified based on the frequency index in the frequency domain and the symbol position in the time domain (see 3GPP TS 38.211 v15.6.0).

5G NR Functional Split Between NG-RAN and 5GC

Figure 3:
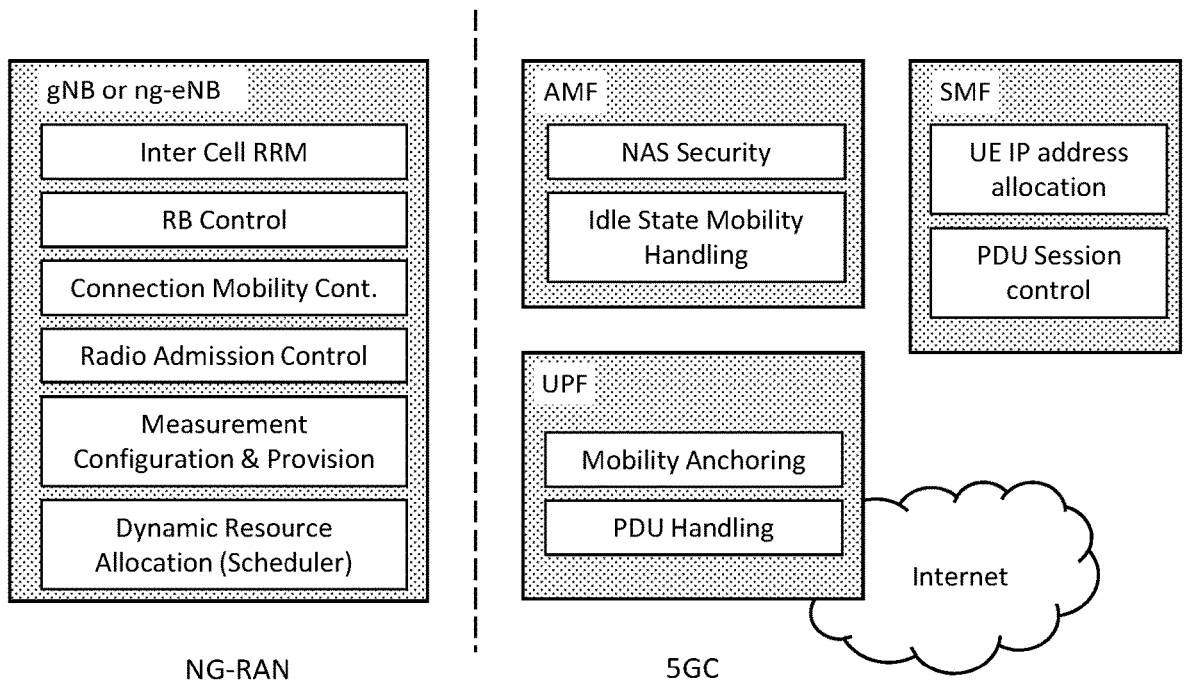
FIG. 3 is a schematic drawing which shows functional split between NG-RAN and 5GC.

FIG. 3 illustrates functional split between NG-RAN and 5GC. NG-RAN logical node is a gNB or ng-eNB. The 5GC has logical nodes AMF, UPF and SMF.

In particular, the gNB and ng-eNB host the following main functions:
 Functions for Radio Resource Management such as Radio Bearer Control, Radio Admission Control, Connection Mobility Control, Dynamic allocation of resources to UEs in both uplink and downlink (scheduling);
 IP header compression, encryption and integrity protection of data;
 Selection of an AMF at UE attachment when no routing to an AMF can be determined from the information provided by the UE;
 Routing of User Plane data towards UPF(s);
 Routing of Control Plane information towards AMF;
 Connection setup and release;
 Scheduling and transmission of paging messages;
 Scheduling and transmission of system broadcast information (originated from the AMF or OAM);
 Measurement and measurement reporting configuration for mobility and scheduling;
 Transport level packet marking in the uplink;
 Session Management;
 Support of Network Slicing;
 QoS Flow management and mapping to data radio bearers;
 Support of UEs in RRC_INACTIVE state;
 Distribution function for NAS messages;
 Radio access network sharing;
 Dual Connectivity;
 Tight interworking between NR and E-UTRA.

The Access and Mobility Management Function (AMF) hosts the following main functions:
 Non-Access Stratum, NAS, signaling termination;
 NAS signaling security;
 Access Stratum, AS, Security control;
 Inter Core Network, CN, node signaling for mobility between 3GPP access networks;
 Idle mode UE Reachability (including control and execution of paging retransmission);
 Registration Area management;
 Support of intra-system and inter-system mobility;
 Access Authentication;
 Access Authorization including check of roaming rights;
 Mobility management control (subscription and policies);
 Support of Network Slicing;
 Session Management Function, SMF, selection.

Furthermore, the User Plane Function, UPF, hosts the following main functions:
 Anchor point for Intra-/Inter-RAT mobility (when applicable);
 External PDU session point of interconnect to Data Network;
 Packet routing & forwarding;
 Packet inspection and User plane part of Policy rule enforcement;
 Traffic usage reporting;
 Uplink classifier to support routing traffic flows to a data network;
 Branching point to support multi-homed PDU session;
 QoS handling for user plane, e.g., packet filtering, gating, UL/DL rate enforcement;
 Uplink Traffic verification (SDF to QoS flow mapping);
 Downlink packet buffering and downlink data notification triggering.

Finally, the Session Management function, SMF, hosts the following main functions:
 Session Management;
 UE IP address allocation and management;
 Selection and control of UP function;
 Configures traffic steering at User Plane Function, UPF, to route traffic to proper destination;
 Control part of policy enforcement and QoS;
 Downlink Data Notification.

RRC Connection Setup and Reconfiguration Procedures

Figure 4:
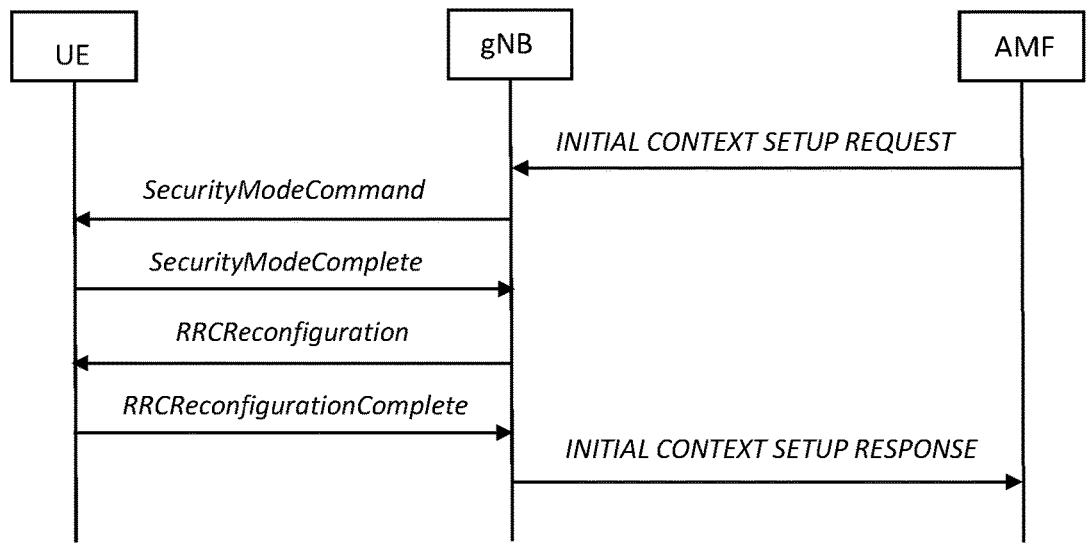
FIG. 4 is a sequence diagram for RRC connection setup/reconfiguration procedures.

FIG. 4 illustrates some interactions between a UE, gNB, and AMF (an 5GC entity) in the context of a transition of the UE from RRC_IDLE to RRC_CONNECTED for the NAS part (see TS 38.300 v15.6.0).

RRC is a higher layer signaling (protocol) used for UE and gNB configuration. In particular, this transition involves that the AMF prepares the UE context data (including, e.g., PDU session context, the Security Key, UE Radio Capability and UE Security Capabilities, etc.) and sends it to the gNB with the INITIAL CONTEXT SETUP REQUEST. Then, the gNB activates the AS security with the UE, which is performed by the gNB transmitting to the UE a SecurityModeCommand message and by the UE responding to the gNB with the SecurityModeComplete message. Afterwards, the gNB performs the reconfiguration to setup the Signaling Radio Bearer 2, SRB2, and Data Radio Bearer(s), DRB(s) by means of transmitting to the UE the RRCReconfiguration message and, in response, receiving by the gNB the RRCReconfigurationComplete from the UE. For a signaling-only connection, the steps relating to the RRCReconfiguration are skipped since SRB2 and DRBs are not setup. Finally, the gNB informs the AMF that the setup procedure is completed with the INITIAL CONTEXT SETUP RESPONSE.

In the present disclosure, thus, an entity (for example AMF, SMF, etc.) of a 5th Generation Core (5GC) is provided that comprises control circuitry which, in operation, establishes a Next Generation (NG) connection with a gNodeB, and a transmitter which, in operation, transmits an initial context setup message, via the NG connection, to the gNodeB to cause a signaling radio bearer setup between the gNodeB and a user equipment (UE). In particular, the gNodeB transmits a Radio Resource Control, RRC, signaling containing a resource allocation configuration information element to the UE via the signaling radio bearer. The UE then performs an uplink transmission or a downlink reception based on the resource allocation configuration.

Usage Scenarios of IMT for 2020 and Beyond

Figure 5:
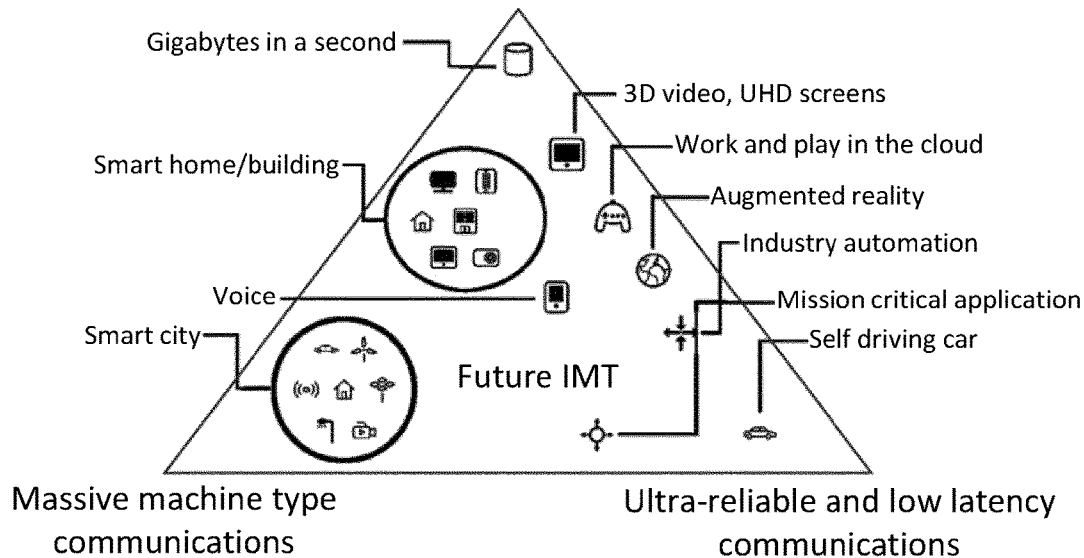
FIG. 5 is a schematic drawing showing usage scenarios of Enhanced mobile broadband, Massive Machine Type Communications (mMTC) and Ultra Reliable and Low Latency Communications (URLLC)

FIG. 5 illustrates some of the use cases for 5G NR. In 3rd generation partnership project new radio (3GPP NR), three use cases are being considered that have been envisaged to support a wide variety of services and applications by IMT-2020. The specification for the phase 1 of enhanced mobile-broadband (eMBB) has been concluded. In addition to further extending the eMBB support, the current and future work would involve the standardization for ultra-reliable and low-latency communications (URLLC) and massive machine-type communications. FIG. 5 illustrates some examples of envisioned usage scenarios for IMT for 2020 and beyond.

The URLLC use case has stringent requirements for capabilities such as throughput, latency and availability and has been envisioned as one of the enablers for future vertical applications such as wireless control of industrial manufacturing or production processes, remote medical surgery, distribution automation in a smart grid, transportation safety, etc. Ultra-reliability for URLLC is to be supported by identifying the techniques to meet the requirements set by TR 38.913. For NR URLLC in Release 15, key requirements include a target user plane latency of 0.5 ms for UL (uplink) and 0.5 ms for DL (downlink). The general URLLC requirement for one transmission of a packet is a BLER (block error rate) of 1E-5 for a packet size of 32 bytes with a user plane latency of 1 ms.

From RAN1 perspective, reliability can be improved in a number of possible ways. The current scope for improving the reliability involves defining separate CQI tables for URLLC, more compact DCI formats, repetition of PDCCH, etc. However, the scope may widen for achieving ultra-reliability as the NR becomes more stable and developed (for NR URLLC key requirements). Particular use cases of NR URLCC in Rel. 15 include Augmented Reality/Virtual Reality (AR/VR), e-health, e-safety, and mission-critical applications.

Moreover, technology enhancements targeted by NR URLCC aim at latency improvement and reliability improvement. Technology enhancements for latency improvement include configurable numerology, non slot-based scheduling with flexible mapping, grant free (configured grant) uplink, slot-level repetition for data channels, and downlink pre-emption. Pre-emption means that a transmission for which resources have already been allocated is stopped, and the already allocated resources are used for another transmission that has been requested later, but has lower latency/higher priority requirements. Accordingly, the already granted transmission is pre-empted by a later transmission. Pre-emption is applicable independent of the particular service type. For example, a transmission for a service-type A (URLCC) may be pre-empted by a transmission for a service type B (such as eMBB). Technology enhancements with respect to reliability improvement include dedicated CQI/MCS tables for the target BLER of 1E-5.

The use case of mMTC (massive machine type communication) is characterized by a very large number of connected devices typically transmitting a relatively low volume of non-delay sensitive data. Devices are required to be low cost and to have a very long battery life. From NR perspective, utilizing very narrow bandwidth parts is one possible solution to have power saving from UE perspective and enable long battery life.

As mentioned above, it is expected that the scope of reliability in NR becomes wider. One key requirement to all the cases, and especially necessary for URLLC and mMTC, is high reliability or ultra-reliability. Several mechanisms can be considered to improve the reliability from radio perspective and network perspective. In general, there are a few key potential areas that can help improve the reliability. Among these areas are compact control channel information, data/control channel repetition, and diversity with respect to frequency, time and/or the spatial domain. These areas are applicable to reliability in general, regardless of particular communication scenarios.

For NR URLLC, further use cases with tighter requirements have been identified such as factory automation, transport industry and electrical power distribution, including factory automation, transport industry, and electrical power distribution. The tighter requirements are higher reliability (up to 10-6 level), higher availability, packet sizes of up to 256 bytes, time synchronization down to the order of a few Its where the value can be one or a few s depending on frequency range and short latency in the order of 0.5 to 1 ms in particular a target user plane latency of 0.5 ms, depending on the use cases.

Moreover, for NR URLCC, several technology enhancements from RAN1 perspective have been identified. Among these are PDCCH (Physical Downlink Control Channel) enhancements related to compact DCI, PDCCH repetition, increased PDCCH monitoring. Moreover, UCI (Uplink Control Information) enhancements are related to enhanced HARQ (Hybrid Automatic Repeat Request) and CSI feedback enhancements.

Also PUSCH enhancements related to mini-slot level hopping and retransmission/repetition enhancements have been identified. The term "mini-slot" refers to a Transmission Time Interval (TTI) including a smaller number of symbols than a slot (a slot comprising fourteen symbols).

QoS Control

The 5G QoS (Quality of Service) model is based on QoS flows and supports both QoS flows that require guaranteed flow bit rate (GBR QoS flows) and QoS flows that do not require guaranteed flow bit rate (non-GBR QoS Flows). At NAS level, the QoS flow is thus the finest granularity of QoS differentiation in a PDU session. A QoS flow is identified within a PDU session by a QoS flow ID (QFI) carried in an encapsulation header over NG-U interface.

For each UE, 5GC establishes one or more PDU Sessions. For each UE, the NG-RAN establishes at least one Data Radio Bearers (DRB) together with the PDU Session, and additional DRB(s) for QoS flow(s) of that PDU session can be subsequently configured (it is up to NG-RAN when to do so), e.g., as shown above with reference to FIG. 4. The NG-RAN maps packets belonging to different PDU sessions to different DRBs. NAS level packet filters in the UE and in the 5GC associate UL and DL packets with QoS Flows, whereas AS-level mapping rules in the UE and in the NG-RAN associate UL and DL QoS Flows with DRBs.

Figure 6:
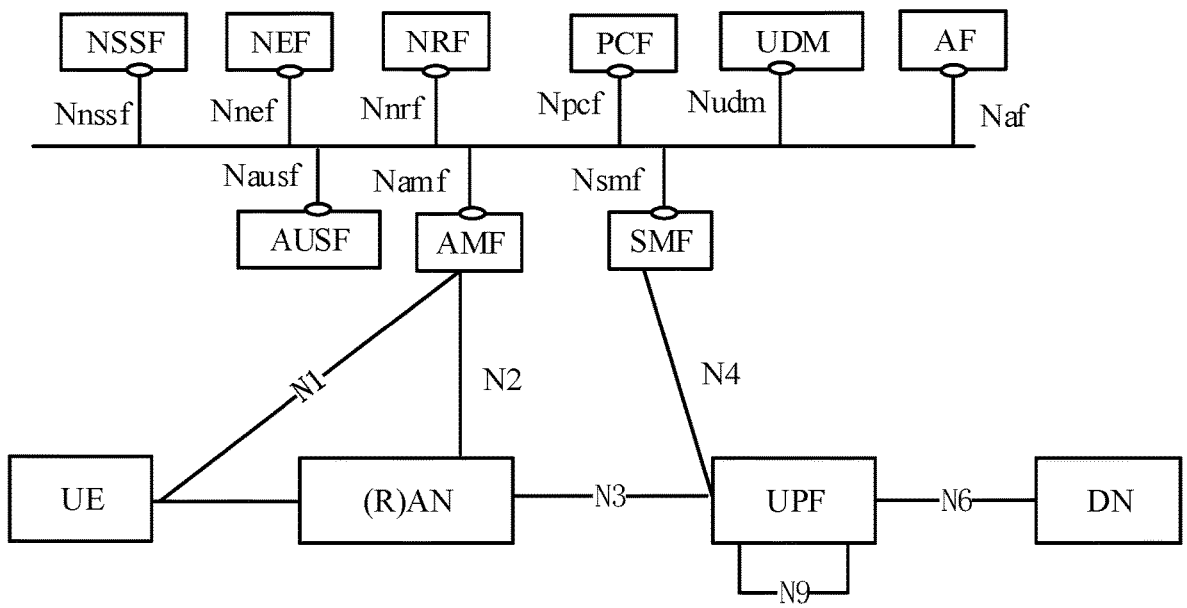
FIG. 6 is a block diagram which shows an exemplary 5G system architecture for a non-roaming scenario.

FIG. 6 illustrates a 5G NR non-roaming reference architecture (see TS 23.501 v16.1.0, section 4.23). An Application Function (AF), e.g., an external application server hosting 5G services exemplary described in FIG. 5, interacts with the 3GPP Core Network in order to provide services, for example to support application influence on traffic routing, accessing Network Exposure Function (NEF) or interacting with the Policy framework for policy control (see Policy Control Function, PCF), e.g., QoS control. Based on operator deployment, Application Functions considered to be trusted by the operator can be allowed to interact directly with relevant Network Functions. Application Functions not allowed by the operator to access directly the Network Functions use the external exposure framework via the NEF to interact with relevant Network Functions.

FIG. 6 shows further functional units of the 5G architecture, namely Network Slice Selection Function (NSSF), Network Repository Function (NRF), Unified Data Management (UDM), Authentication Server Function (AUSF), Access and Mobility Management Function (AMF), Session Management Function (SMF), and Data Network (DN), e.g., operator services, Internet access or 3rd party services.

A terminal is referred to in LTE and NR as a user equipment (UE). This may be a mobile device such as a wireless phone, smartphone, tablet computer, or an USB (universal serial bus) stick with the functionality of a user equipment. However, the term mobile device is not limited thereto, in general, a relay may also have functionality of such mobile device, and a mobile device may also work as a relay.

A base station is a network node, e.g., forming a part of the network for providing services to terminals. A base station is a network node, which provides wireless access to terminals. Communication between the terminal and the base station is typically standardized. In LTE and NR, the wireless interface protocol stack includes physical layer, medium access layer (MAC) and higher layers. In control plane, higher-layer protocol Radio Resource Control protocol is provided. Via RRC, the base station can control configuration of the terminals and terminals may communicate with the base station to perform control tasks such as connection and bearer establishment, modification, or the like, measurements, and other functions.

Services for transfer of data provided by a layer to the higher layers are usually referred to as channels. For example, the LTE and the NR distinguish logical channels provided for higher layers by the MAC layer, transport channels provided by the physical layer to the MAC layer and physical channels which define mapping on the physical resources.

Logical channels are different kinds of data transfer services as offered by MAC. Each logical channel type is defined by what type of information is transferred. Logical channels are classified into two groups: Control Channels and Traffic Channels. Control channels are used for the transfer of control plane information only. Traffic channels are used for the transfer of user plane information only.
Discontinuous Reception—DRX Packet-data is often highly bursty, with occasional periods of silence. From a delay perspective, it is beneficial to monitor the downlink control signaling permanently to receive uplink grants or downlink data transmissions and instantaneously react on changes in the traffic behavior. At the same time this comes at a cost in terms of power consumption at the device. To reduce the device power consumption, LTE includes mechanisms for discontinuous reception (DRX).

An exemplary implementation of the discontinued reception (DRX) function in 5G NR that involves PDCCH monitoring, according to the currently standardized version, will be explained in a simplified and abbreviated form in the following.

The basic mechanism for DRX is a configurable DRX cycle in the device. With a DRX cycle configured, the device monitors the downlink control signaling only in an active period per DRX cycle, sleeping with the receiver circuitry switched off in the remaining off period. This allows for a significant reduction in power consumption. Naturally, this implies restrictions to the scheduler as the device can be addressed only in the active periods.

To reduce the battery consumption in the UE, a mechanism to minimize the time the UE spends monitoring the PDCCH is used, which is called the Discontinuous Reception (DRX) functionality. DRX functionality can be configured for RRC_IDLE, in which case the UE uses either the specific or default DRX value (defaultPagingCycle); the default paging cycle is broadcasted in the System Information and can have values of 32, 64, 128 and 256 radio frames. The UE needs to wake up for one paging occasion per DRX cycle, the paging occasion being one subframe. DRX functionality can be also configured for an "RRC_CONNECTED" UE, so that it does not always need to monitor the downlink control channels for downlink control information (or phrased simply: the UE monitors the PDCCH) (see 3GPP Technical Standard TS 38.321 "NR; Medium Access Control (MAC) protocol specification," 15.6.0, chapter 5.7).

The following parameters are available to define the DRX UE behavior; e.g., the On-Duration periods at which the mobile node is active (i.e., in DRX Active Time), and the periods where the mobile node is in DRX (i.e., not in DRX Active Time).

drx-onDurationTimer: the duration at the beginning of a DRX cycle;

drx-SlotOffset: the delay before starting the drx-onDurationTimer;

drx-InactivityTimer: the duration after the PDCCH occasion in which a PSCCH indicates a new UL or DL transmission for the MAY entity;

drx-RetransmissionTimerDL (per DL HARQ process except for the broadcast process): the maximum duration until a DL retransmission is received;

drx-RetransmissionTimerUL (per UL HARQ process): the maximum duration until a grant for UL retransmission is received;

drx-LongCycleStartOffset: the Long DRX cycle and drx-StartOffset which defines the subframe where the Long and Short DRX Cycle starts;

drx-ShortCycle (optional): the Short DRX cycle;

drx-ShortCycleTimer (optional): the duration the UE shall follow the Short DRX cycle;

drx-HARQ-RTT-TimerDL (per DL HARQ process except for the broadcast process): the minimum duration before a DL assignment for HARQ retransmission is expected by the MAC entity;

drx-HARQ-RTT-TimerUL (per UL HARQ process): the minimum duration before a UL HARQ retransmission grant is expected by the MAC entity.

The total duration that the UE is awake is called "Active time" or DRX Active Time. The Active Time, e.g., includes the time while drx-onDurationTimer or drx-InactivityTimer or drx-RetransmissionTimerDL or drx-RetransmissionTimerUL or ra-ContentionResolutionTimer (as described in clause 5.1.5 of 3GPP TS38.321) is running; or a Scheduling Request is sent on PUCCH and is pending (as described in clause 5.4.4 of 3GPP TS38.321); or a PDCCH indicating a new transmission addressed to the C-RNTI of the MAC entity has not been received after successful reception of a Random Access Response for the Random Access Preamble not selected by the MAC entity among the contention-based Random Access Preamble (as described in clause 5.1.4 of 3GPP TS38.321).

The "DRX period" or "DRX off period" is the duration of downlink subframes during which a UE can skip reception of downlink channels for battery saving purposes, i.e., is not required to monitor the downlink channels. The operation of DRX gives the mobile terminal the opportunity to deactivate the radio circuits repeatedly (according to the currently active DRX cycle) in order to save power. Whether the UE indeed remains in DRX (i.e., is not active) during the DRX period may be decided by the UE; for example, the UE usually performs inter-frequency measurements which cannot be conducted during the On-Duration, and thus need to be performed at some other time, e.g., during the DRX off time.

To meet conflicting requirements, two DRX cycles—a short cycle and a long cycle—can be configured for each UE; the short DRX cycle is optional, i.e., only the long DRX cycle could be used. The transition between the short DRX cycle, the long DRX cycle and continuous reception is controlled either by a timer or by explicit commands from the gNB. In some sense, the short DRX cycle can be considered as a confirmation period in case a late packet arrives, before the UE enters the long DRX cycle. If data arrives at the gNB while the UE is in the short DRX cycle, the data is scheduled for transmission at the next on-duration time, and the UE then resumes continuous reception. On the other hand, if no data arrives at the gNB during the short DRX cycle, the UE enters the long DRX cycle, assuming that the packet activity is finished for the time being.

During the Active Time, the UE monitors the PDCCH, reports SRS (Sounding Reference Signal) as configured and reports CQI (Channel Quality Information)/PMI (Precoding Matrix Indicator)/RI (Rank Indicator)/PTI (Precoder Type Indication) on PUCCH. When UE is not in Active time, type-0-triggered SRS and CQI/PMI/RI/PTI on PUCCH may not be reported. If CQI masking is set up for the UE, the reporting of CQI/PMI/RI/PTI on PUCCH is limited to the On-Duration subframes.

DRX cycles may be configured in the NR downlink so that the UE, by periodically switching off of a receiver, does not have to decode the physical downlink control channel (PDCCH) or receive physical downlink shared channel (PDSCH) transmission in certain periods, as defined, for instance, in 3GPP TS 38.321 ("NR; Medium Access Control (MAC) protocol specification," version 15.6.0, section 5.7) for connected mode, and 3GPP TS 38.304 ("User Equipment (UE) procedures in Idle mode and RRC Inactive state," version 15.4.0, section 7.1) for idle or inactive state.

According to the 3GPP TS 38.321 v15.6.0 specification, when a DRX cycle is configured, the active time includes times where a drx-onDurationTimer, a drx-InactivityTimer, a drx-RetransmissionTimerDL, a drx-RetransmissionTimerUL or a ra-ContentionResolutionTimer is running, as described in section 5.1.5 of 3GPP TS 38.321.

The drx-onDurationTimer defines the duration at the beginning of a DRX cycle, whereas the drx-InactivityTimer specifies the duration after the PDCCH occasion in which a PDCCH indicates a new uplink (UL) or downlink (DL) transmission for the MAC entity. The drx-RetransmissionTimerDL and -UL define the maximum duration until a DL retransmission is received and the maximum duration until a grant for UL retransmission is received, respectively.

Discontinuous Reception with HARQ Feedback

Transmissions over wireless channels are subject to errors, for example due to variation in the received signal quality. Therefore, wireless communication systems may employ a form of forward error correction (FEC), adding redundancy to the transmitted signal allowing a receiver to correct errors. However, there might be data units received in error. A Hybrid Automatic Repeat Request (HARQ) process relies on a combination of error-correcting coding and retransmission (reTx) of erroneous data units and is used in many communication systems.

Data units in error despite the error-correcting coding are detected by the receiver, which requests a retransmission from the transmitter. In particular, an acknowledgement (ACK) message or a negative acknowledgement (NACK) message may be sent by the receiver. In a case where a NACK is sent, the scheduling device may schedule a retransmission of the data unit and transmit corresponding DCI.

That is, the PDCCH is to be monitored for reception of DCI for retransmission of the data. This is also true when a DRX cycle is configured for the receiver.

In the following, a transceiver device according to the present disclosure may be also referred to as UE. However, even though the present disclosure makes use of the term UE, it is not limited to a UE in LTE or NR, but may apply to any other transceiver device.

Figure 7A:
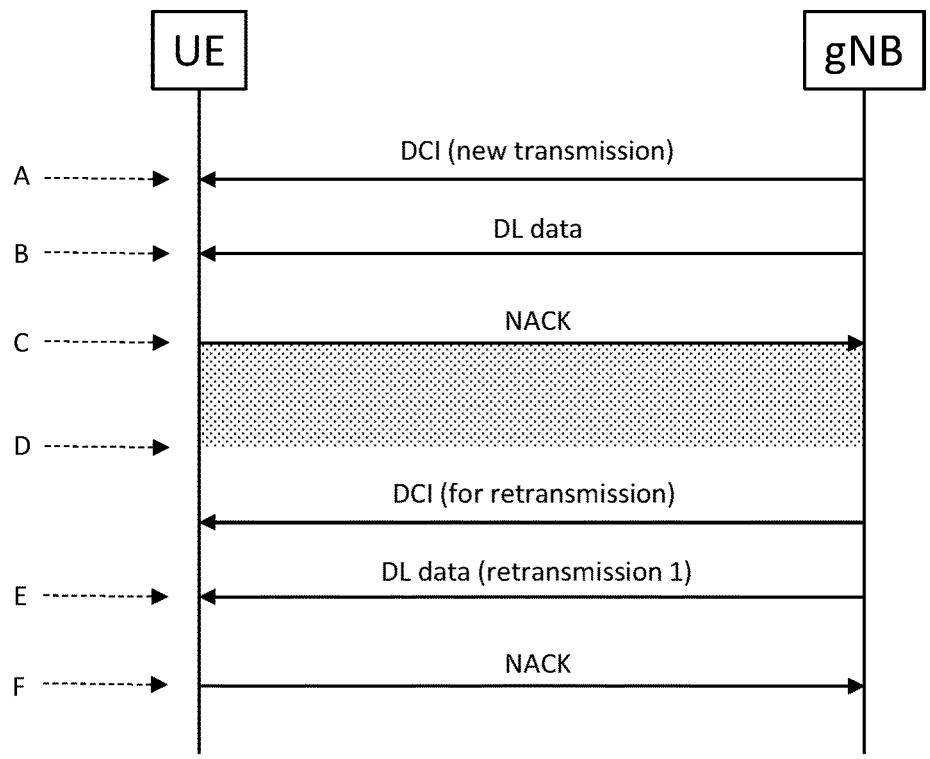
FIG. 7A illustrates a DRX procedure with HARQ feedback for transmission of downlink data.

FIG. 7A illustrates a DRX procedure with HARQ feedback. At time A, UE receives DCI for a new downlink transmission during an active time of a configured DRX cycle. At time B, the corresponding data is received by the UE via a PDSCH and, subsequently, the received data is decoded. In a case where the data could not decoded successfully, a NACK message is transmitted from UE to gNB at time C.

Every signal transmission based on electromagnetic waves is subject to a signal transmission delay due to the speed of light. In particular, twice the one-way propagation delay for a radio signal between a source and a destination is referred to as the round trip delay (RTD). A processing time at the processing node for a response signal to be generated may also be included in the RTD.

For this reason, after having sent the NACK, the UE stops monitoring PDCCH and starts a timer drx-HARQ-RTT-TimerDL. As long as the drx-HARQ-RTT-TimerDL has not expired, UE does not monitor PDCCH in order to reduce power consumption. The sleeping period is indicated as a shaded area in FIG. 7A.

At time D, the drx-HARQ-RTT-TimerDL expires and the UE starts monitoring the PDCCH again and subsequently receives DCI for a retransmission of the data. At time E, the data is transmitted again and received by UE. If the received data cannot be decoded successfully, a further NACK may be transmitted at time F.

In this procedure, the retransmission is triggered by feedback of the UE on whether the previously transmitted data was successfully received and decoded. During a period where no transmission of DCI for a retransmission of the data can be expected due to the RTD, the UE enters a sleep mode where the PDCCH is not monitored, in order to reduce the power consumption. Once the timer has expired and transmission of DCI for the retransmission can be expected, the UE starts monitoring the PDCCH again.

Figure 7B:
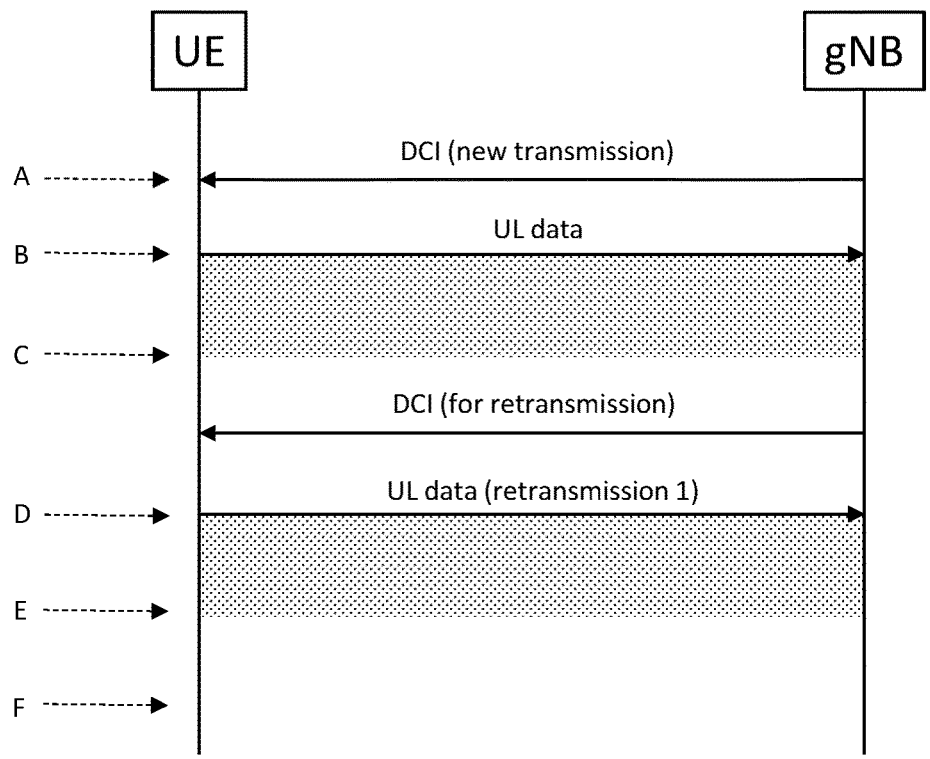
FIG. 7B illustrates a DRX procedure with HARQ feedback for transmission of uplink data.

FIG. 7B illustrates a DRX procedure with HARQ feedback for transmission of uplink data.

At time A, UE receives DCI for a new uplink transmission during an active time of a configured DRX cycle and starts the drx-InactivityTimer. At time B, the corresponding data is transmitted by the UE via a PDSCH.

After having transmitted the UL data, the UE stops monitoring PDCCH, stops the drx-RetransmissionTimerUL (if it is running) and starts the timer drx-HARQ-RTT-TimerUL. As long as the drx-HARQ-RTT-TimerUL has not expired, UE does not monitor PDCCH in order to reduce power consumption. The sleeping period is indicated as a shaded area in FIG. 7B.

At time C, the drx-HARQ-RTT-TimerUL expires, the drx-RetransmissionTimerUL is started and the UE starts monitoring the PDCCH again. Subsequently, DCI for a retransmission of the data is received. At time D, the UL data is transmitted again, the drx-HARQ-RTT-TimerUL is restarted and the UE stops monitoring the PDCCH until the drx-HARQ-RTT-TimerUL has expired at time E. At time F, the drx-RetransmissionTimerUL expires.

In this procedure, the retransmission is triggered by reception of DCI for a retransmission of the UL data. During a period where no transmission of DCI for a retransmission of the data can be expected due to the RTD, the UE enters a sleep mode where the PDCCH is not monitored, in order to reduce the power consumption. Once the timer has expired and transmission of DCI for the retransmission can be expected, the UE starts monitoring the PDCCH again.

Non-Terrestrial Networks

In 3GPP, NR-based operation in a non-terrestrial network (NTN) is studied and described (see, e.g., 3GPP TR 38.811, Study on New Radio (NR) to support non-terrestrial networks, version 15.0.0, and 3GPP TR 38.821, Solutions for NR to support non-terrestrial networks, version 0.3.0).

Thanks to the wide service coverage capabilities and reduced vulnerability of space/airborne vehicles to physical attacks and natural disasters, NTNs may foster the rollout of NR service in unserved areas that cannot be covered by terrestrial NR networks (for instance isolated or remote areas, on board aircraft or vessels) and unserved (for instance suburban and rural areas). Further, NTNs may reinforce NR service reliability by providing service continuity for passengers on moving platforms or ensuring service availability anywhere, especially for critical communication.

The benefits relate to either non-terrestrial networks operating alone or to integrated terrestrial and non-terrestrial networks, which may impact coverage, user bandwidth, system capacity, service reliability or availability.

A non-terrestrial network refers to a network, or segment of networks using RF resources on board of a satellite, for instance. NTNs typically feature the following system elements: an NTN terminal, which may refer to a 3GPP UE or a terminal specific to the satellite system in case a satellite does not serve directly 3GPP UEs; a service link which refers to the radio link between the user equipment and the space/airborne platform; an airborne platform embarking a payload; gateways that connect the space/airborne platform to the core network; feeder links which refer to the radio links between the Gateway Center space/airborne platform.

The round-trip delay depends on the distance between the source node, for instance, a terminal (UE), and a destination node. In NTNs, where signals may transmitted via a satellite or the like, the value of the RTD may be much larger than in terrestrial networks. For instance, in a case of a signal being transmitted via a satellite in geostationary orbit, that is, at approximately 35786 km altitude, the RTD may be as large as 541.14 ms.

Blind Retransmission without HARQ Feedback

In order to ensure fast and reliable transmission of data, retransmissions may be sent without having received any feedback from the UE. That is, the UE may not transmit a NACK to gNB in a case where the received data could not be decoded successfully. Instead, gNB may retransmit the data for a configured number of times.

Further, for uplink data transmission, gNB may transmit DCI for retransmission of UL without having received the first transmission of the UL data, such that the UE performs a blind retransmission of the UL data.

With this approach, the RTD due to the feedback loop does not occur while at the same time, the reliability of data transmission is increased by the multiple retransmissions.

A blind retransmission refers to a further transmission of data without having received any feedback on successfully/unsuccessfully reception or decoding at the data destination, for example the UE.

HARQ feedback could be, for instance, disabled by network. In this case, no ACK/NACK is sent back to gNB for downlink, for instance. However, even without ACK/NACK feedback, gNB may still send retransmissions, if configured. In other words, gNB can assume NACK for a previous transmission or retransmission of data.

Figure 8:
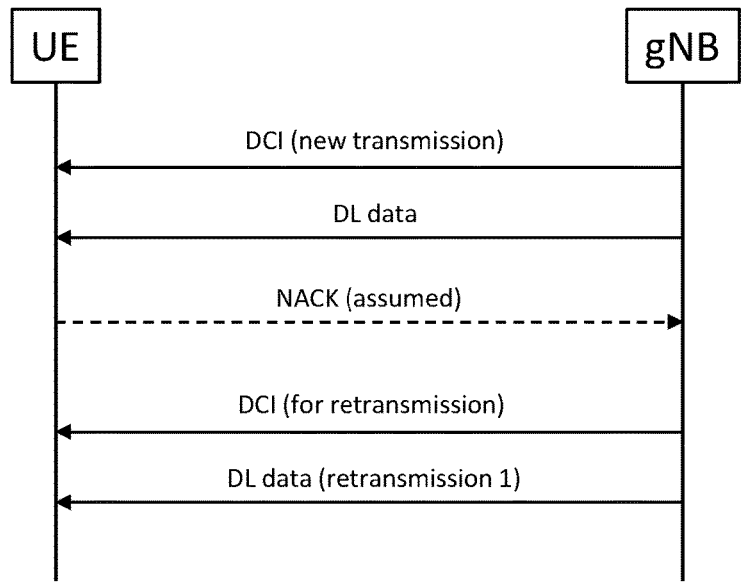
FIG. 8 illustrates a process of blind retransmissions without having received ACK/NACK feedback.

FIG. 8 illustrates retransmission of data without having received NACK at gNB. As a first step, DCI for a new transmission is sent to the UE, followed by a transmission of the data (DL data). gNB subsequently assumes NACK and transmits further DCI and corresponding DL data. In other words, the data may be transmitted by gNB multiple times (with preceding transmission of DCI) without having received any feedback from the UE.

Retransmissions in DRX with/without HARQ

Figure 9:
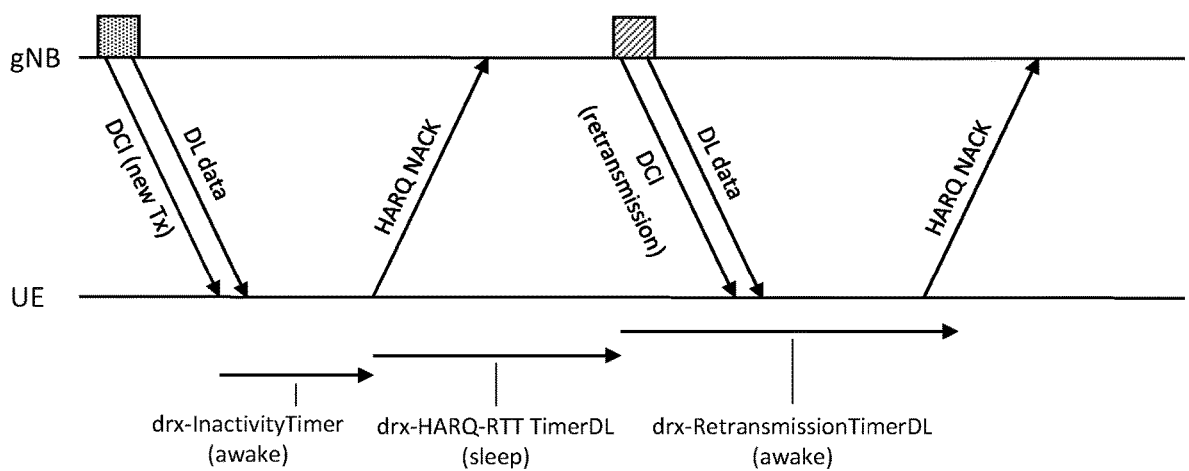
FIG. 9 illustrates a process of retransmission of data when a DRX cycle is configured for a transceiver device.

FIG. 9 illustrates a process of retransmission of DL data when a DRX cycle is configured. In the Figure, the temporal sequence of transmissions is indicated from left to right. In order for retransmission of data and corresponding DCI not being performed within an off period of a UE in a case where a DRX cycle is configured, UE start the drx-InactivityTimer once DCI for a new transmission is received. As long as the drx-InactivityTimer has not expired, UE monitors the channel for reception of the DL data. When the DL data is received and cannot be decoded successfully, UE transmits NACK to gNB and starts the drx-HARQ-RTT-TimerDL in order to account for the RTD.

As long as drx-HARQ-RTT-TimerDL has not expired, the UE does not monitor PDCCH in order to reduce power consumption. After the drx-HARQ-RTT-TimerDL has expired, the drx-RetransmissionTimerDL is started and, as long as said timer has not expired, PDCCH is monitored for reception of DCI for retransmission of the DL data, which may be subsequently received.

Similarly, in a case where data is to be transmitted by the UE to gNB and a DRX cycle is configured, UE starts the drx-InactivityTimer when DCI for a first transmission of UL data is received. After having transmitted the UL data accordingly, the drx-HARQ-RTT-TimerUL is started in order to account for RTD. As long as drx-HARQ-RTT-TimerUL has not expired, the UE does not monitor PDCCH in order to reduce power consumption. After the drx-HARQ-RTT-TimerUL has expired, the drx-RetransmissionTimerUL is started and, as long as said timer has not expired, PDCCH is monitored for reception of DCI for retransmission of the UL data, which may be subsequently received.

Without feedback on successful/unsuccessful reception of the DL data or DCI for retransmission of UL data, the UE is not aware of whether any further retransmissions are expected or not after a previous transmission, which could not be decoded successfully.

In this case, the drx-HARQ-RTT-TimerDL may be set to zero such that the drx-RetransmissionTimerDL or drx-RetransmissionTimerUL starts straight away. Alternatively, said timers may be disabled, such that the drx-RetransmissionTimerDL (or UL) starts either immediately or after the minimum processing time expires.

Figure 10:
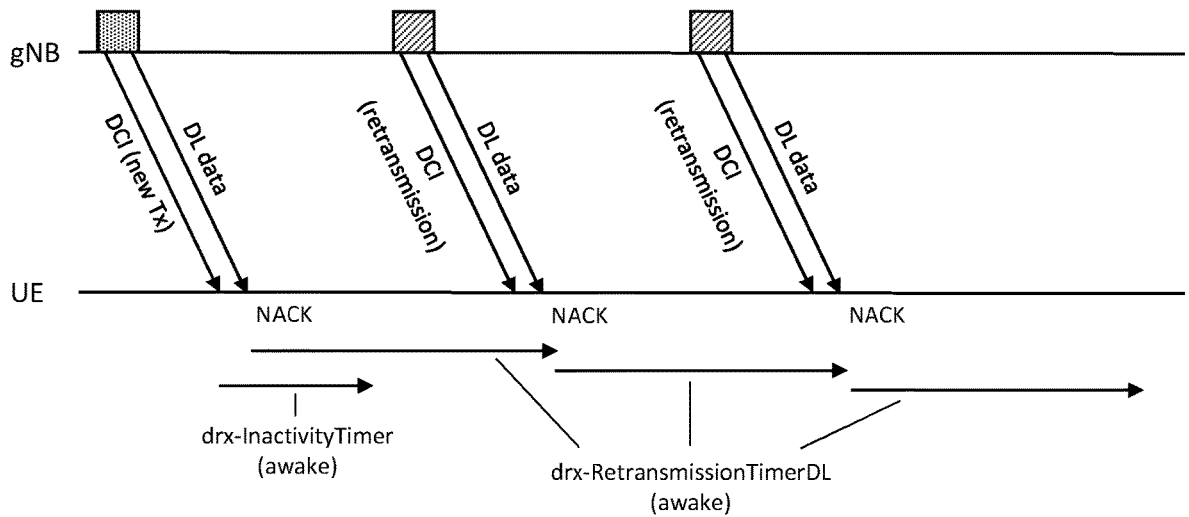
FIG. 10 schematically shows a blind retransmission process without HARQ feedback.

The drx-RetransmissionTimerDL could be started when the DL data could not be decoded successfully, as illustrated in FIG. 10. In the Figure, the temporal sequence of transmissions is indicated from left to right.

However, when UE starts the drx-RetransmissionTimerDL or drx-RetransmissinTimerUL and gNB is not scheduling any retransmission, the power consumption of the UE would be unnecessarily increased.

Figure 11:
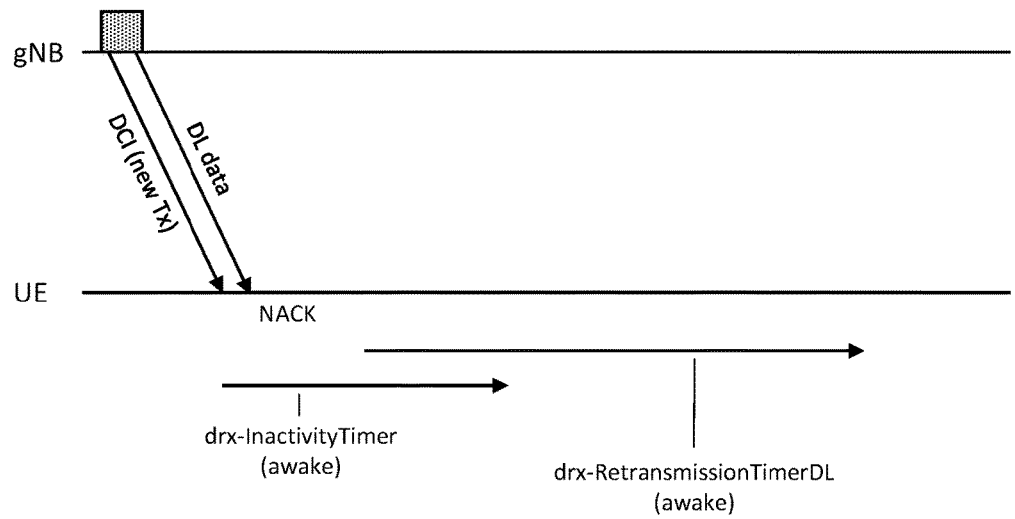
FIG. 11 illustrates a situation where control information and downlink data are received by a transceiver device without a scheduled retransmission, wherein the transceiver device unnecessarily monitors the PDCCH.

FIG. 11 illustrates a situation where DCI and DL data is received by UE, wherein the DL data could not be decoded successfully. In the Figure, the temporal sequence of transmissions is indicated from left to right. If HARQ feedback is disabled by the network, and the UE initiates the drx-RetransmissionTimerDL or drx-RetransmissionTimerUL even though gNB does not schedule a retransmission of the DL data, the UE will monitor the PDCCH unnecessarily as long as the timer is running, thereby increasing the power consumption.

Figure 12:
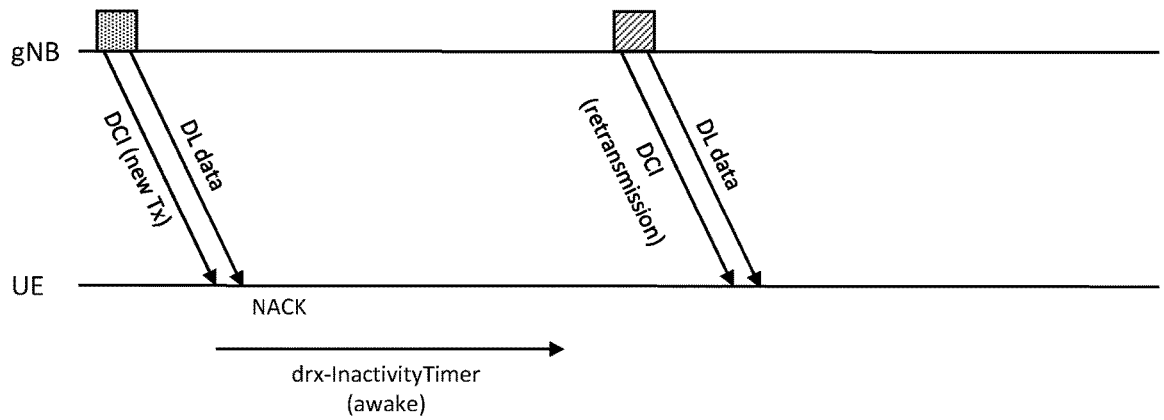
FIG. 12 illustrates a situation where control information and downlink data are received by a transceiver device with a scheduled retransmission, wherein the transceiver device misses the retransmission of the data.

On the other hand, in a case where the UE does not initiate the drx-RetransmissionTimerDL after unsuccessfully decoding of the DL data received in a new transmission, the UE might go to sleep and miss a retransmission from gNB, as illustrated in FIG. 12. In the Figure, the temporal sequence of transmissions is indicated from left to right.

The present disclosure provides techniques which may facilitate for the monitoring duration being adjusted in the framework of blind retransmissions without feedback. In particular, the present disclosure provides a procedure in a configured DRX cycle for reducing the power consumption of a transceiver device while at the same time ensuring reception of retransmissions.

Figure 13:
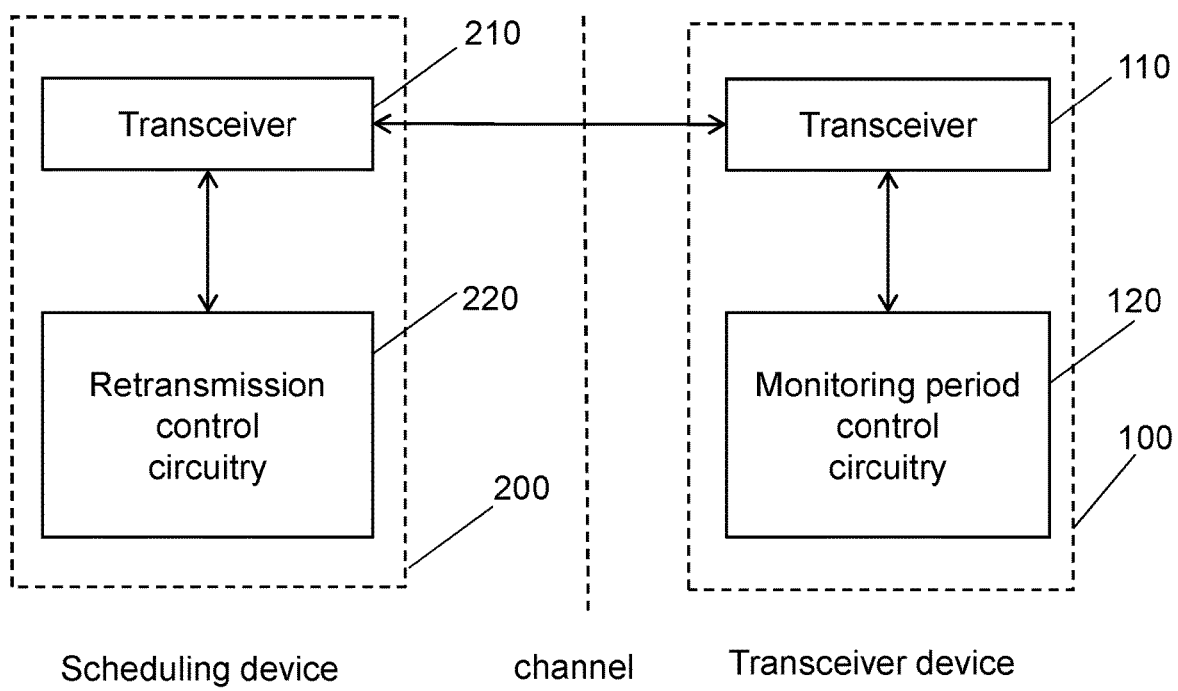
FIG. 13 is a block diagram showing the functional components of a scheduling device and a transceiver device according to an embodiment.

The disclosure provides a transceiver device and a scheduling device as shown in FIG. 13.

The transceiver device 100 comprises a transceiver 110 (a transmitter and/or receiver comprising hardware component(s) such as one or more antennas and control circuitry which controls operation of the hardware component(s)), which, in operation, receives control information over a Physical Downlink Control Channel, PDCCH, the control information indicating a scheduled transmission of data. Further, the transceiver device 100 comprises circuitry 120, which, in operation, sets a monitoring period according to a number of blind retransmissions of the data, wherein the transceiver 110, in operation, monitors the PDCCH during the monitoring period.

For instance, the transceiver device 100 is a UE in a NR network. Accordingly, the transceiver 110 and circuitry 120 are also referred to as "UE transceiver" and "UE circuitry." However, these terms are merely used to distinguish the transceiver 110 and the circuitry 120 from circuitry and transceiver(s) comprised by other devices such as a scheduling device 200 or a base station. The transceiver device 100 may be a terminal service, relay device, or communication device of a similar communication system. The UE circuitry 120 may be considered as or including "monitoring period control circuitry."

Further provided is a scheduling device 200 (or scheduling node) as shown in FIG. 13.

The scheduling device 200 comprises circuitry 220, which, in operation, determines a number of blind retransmissions of data. The scheduling device 200 further comprises a transceiver 210, which, in operation, transmits control information over a Physical Downlink Control Channel, PDCCH, the control information indicating a scheduled transmission or retransmission of the data according to the number of blind retransmission.

For instance, the scheduling device 200 is a network node (base station) in a NR network system (a gNB) or in a similar communication system. The circuitry 220 is also referred to as "retransmission control circuitry" or "scheduling device circuitry," to distinguish it from circuitry such as the UE circuitry 120.

Further provided is a method, comprising receiving control information over a Physical Downlink Control Channel, PDCCH, the control information indicating a scheduled transmission of data; and setting a monitoring period according to a number of blind retransmissions of the data, wherein the PDCCH is monitored during the monitoring period.

In the further description, the details and embodiments apply to each of the transceiver device 100, the scheduling device 200 (or scheduling nodes) and the methods unless explicit statement or context indicates otherwise.

In the following, an embodiment of the present disclosure will be described with reference to FIGS. 14 to 17.

In this embodiment, a monitoring period is set by the circuitry 120 by starting a timer when the transceiver 110 receives DCI (control information) for a first transmission of data. The timer value, i.e., the runtime of the timer, is sufficient for the transceiver 110 to receive all of configured number of retransmissions. When further DCI, for instance, for a retransmission, is received, no timer is started. DCI for a retransmission may be referred to as second control information. As there is no sleep time during the entire round of retransmissions, UE 100 is not required to use drx-HARQ-RTT-TimerDL (or UL), as no HARQ feedback is transmitted from UE 100 to gNB 200.

Whether or not blind retransmissions are performed may be configured semi-statically or dynamically and, depending thereon, the runtime of the timer, which corresponds to the duration of the monitoring period, may be configured semi-statically or dynamically also. If blind transmissions is configured in a semi-static way, RRC signaling may be utilized for configuration of the timer runtime value. If blind retransmission is configured in a dynamic manner, then the timer runtime value can be configured in a dynamic manner as well, for instance via DCI or MAC Control Element (MAC CE) may be utilized. For instance, one bit may be used to indicate whether blind retransmission is configured. For example, a value of zero may indicate that blind retransmission is not configured, and a value of one may indicate that blind retransmission is configured. Further details on signaling of the timer runtime or a number of retransmissions by RRC, MAC CE or DCI are given further below.

In other words, according to this embodiment, the UE 100 is aware of the period wherein retransmissions may be expected. During this monitoring period, PDCCH is monitored for DCI for retransmissions.

According to this embodiment, a single timer may be utilized for setting the monitoring period, wherein the transceiver 110 monitors PDCCH. This allows for fast retransmissions without feedback (HARQ) in order to compensate for long RTDs, for instance, in a NTN.

Figure 14:
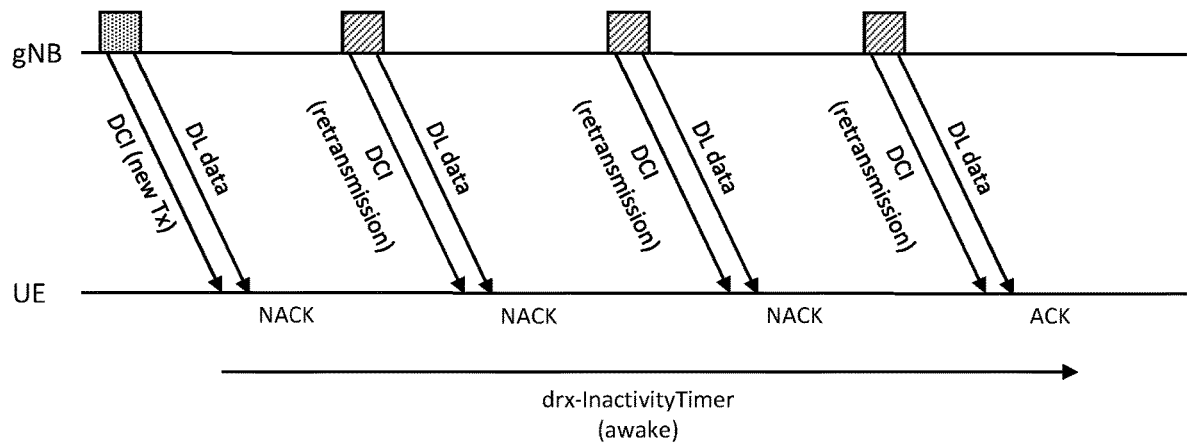
FIG. 14 illustrates the chronological sequence of transmissions between a scheduling device and a transceiver device when the monitoring period is set utilizing the drx-InactivityTimer.
Figure 15:
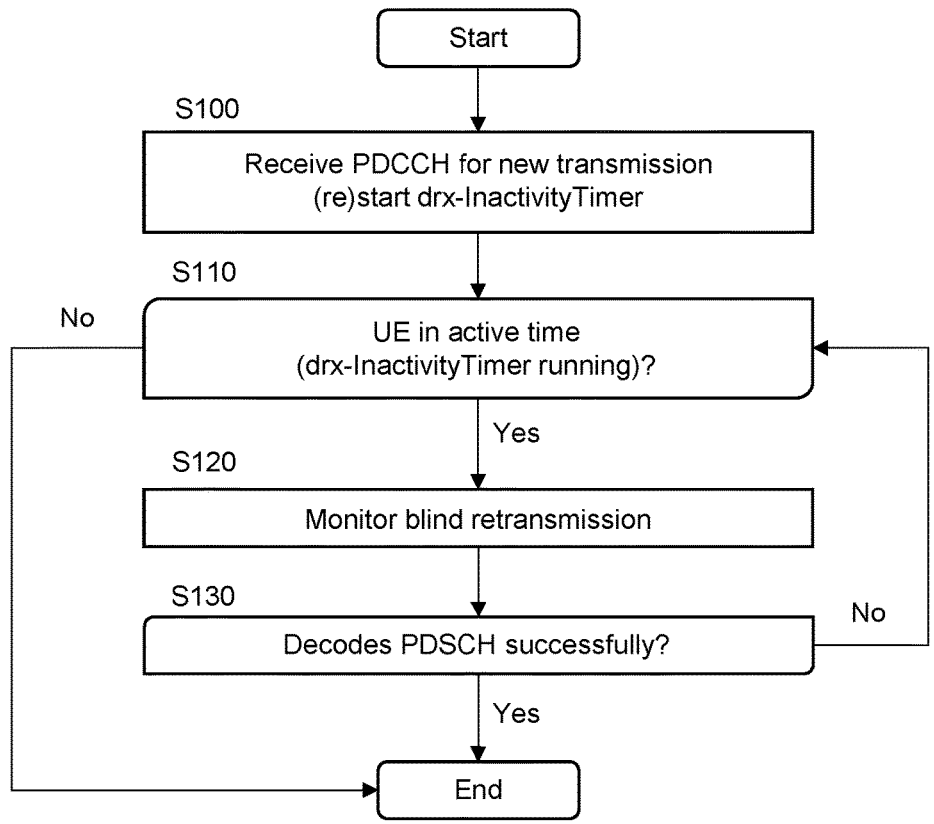
FIG. 15 shows the steps of a method performed a transceiver device when the monitoring period is set utilizing the drx-InactivityTimer.

A first variation of this embodiment is described in the following with reference to FIGS. 14 and 15. FIG. 14 illustrates the chronological sequence of transmissions between gNB 200 (scheduling device) and UE 100 (transceiver device) when the monitoring period is set utilizing the drx-InactivityTimer. FIG. 15 shows the steps of a method performed by UE 100 when the monitoring period is set utilizing the drx-InactivityTimer.

In step S100, the transceiver device 100 or, more particularly, the UE transceiver 110 receives, during an active time of a configured DRX cycle, DCI for a first transmission of downlink (DL) data from gNB. After having received the DCI for the new transmission, the circuitry 120 initiates the monitoring period by starting the drx-InactivityTimer, such that the transceiver 110 monitors the channel for blind transmissions.

Further, in step S110, it is determined whether the drx-InactivityTimer is running. That is, it is determined whether or not UE 100 is in an active time. If the drx-InactivityTimer is not running (No in step S110), the method ends. If, however, it is determined that UE is in an active period, the transceiver 110 monitors the channel for blind retransmissions in step S120.

Further, when the DL data has been received, it is decoded by the circuitry 120. In step S130, it is determined whether the received data could be successfully decoded or not. When the received data could be successfully decoded (Yes in step S130), the method ends. If, however, the data is not successfully decoded, the method proceeds to step S110, where it is determined whether or not the timer, drx-InactivityTimer, is still running.

Note, however, that when the PDSCH transmission is decoded successfully (i.e., the DL data is decoded successfully), the PDCCH does not have to be monitored for this particular HARQ process. However, the UE 100 may continue monitoring the PDCCH for other transmissions to be received.

Further, the drx-InactivityTimer may not be terminated once data received in the framework of a retransmission is decoded successfully but may expire after its respective runtime.

Figure 16:
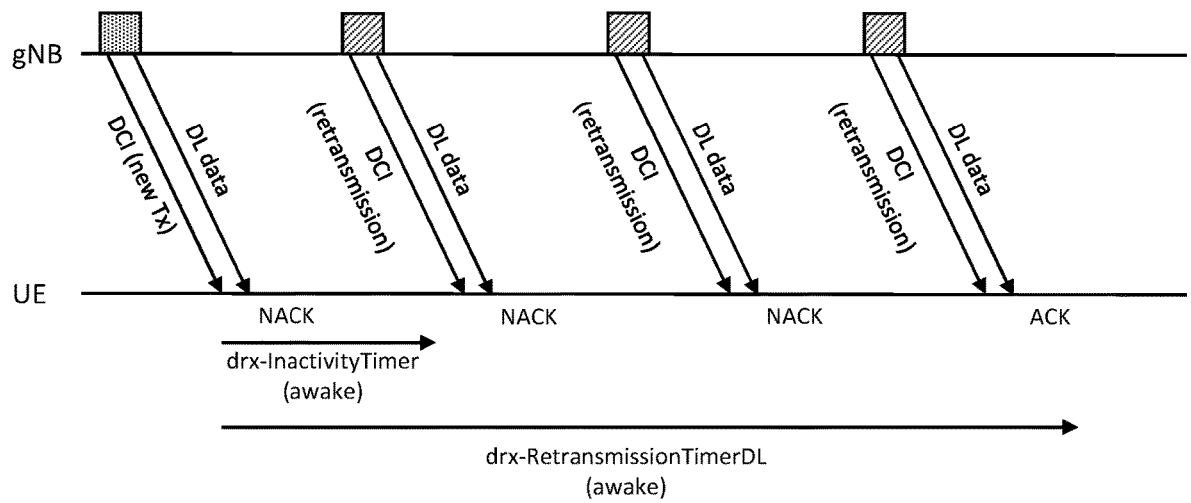
FIG. 16 illustrates the chronological sequence of transmissions between a scheduling device and a transceiver device when the monitoring period is set utilizing the drx-RetransmissionTimer.
Figure 17:
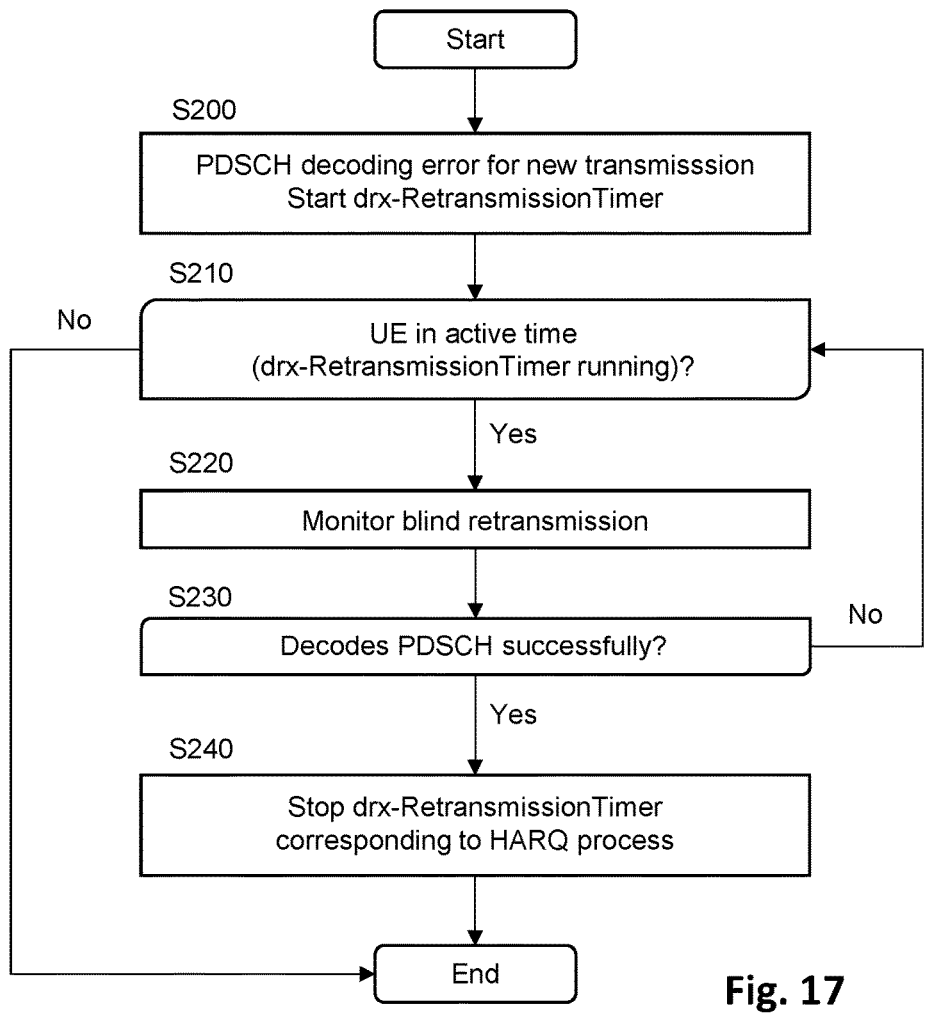
FIG. 17 shows the steps of a method performed by a transceiver device when the monitoring period is set utilizing the drx-RetransmissionTimer.

A second variation of this embodiment is described in the following with reference to FIGS. 16 and 17. FIG. 16 illustrates the chronological sequence of transmissions between gNB 200 (scheduling device) and the UE 100 (transceiver device) when the monitoring period is set utilizing the drx-RetransmissionTimer. FIG. 17 shows the steps of a method performed by the UE 100 when the monitoring period is set utilizing the drx-RetransmissionTimer.

In this variation of the embodiment, the UE 100 starts the drx-RetransmissionTimer after decoding the data transmitted in a first transmission. As can be seen in FIG. 16, the drx-InactivityTimer is initiated after reception of DCI for the first transmission, in accordance with a configured DRX procedure. Further, when the corresponding DL data is received and decoded, the drx-RetransmissionTimer is initiated when an error has occurred in decoding the DL data.

Just as in the variation described above, the runtime of the drx-RetransmissionTimer may be set according to a configuration signaled by gNB via RRC, MAC CE or DCI, for instance, so as to ensure a monitoring period covering configured retransmissions. As the retransmission timer is per HARQ process, it may be stopped when the UE 100 successfully decodes the received data.

In step S200 in FIG. 17, after having received DCI for a first transmission of DL data and reception of respective DL data, the data is decoded and, when decoding cannot be performed successfully, the drx-RetransmissionTimer is started.

In step S210, it is determined whether UE 100 is in active time. In other words, it is determined whether the drx-RetransmissionTimer is running or not. In a case where US 100 is not in active time (No in step S210), the method ends. On the other hand, in a case where it is determined that the drx-RetransmissionTimer is running, i.e., the UE 100 is not in active time, it is continued to step S220.

In step S220, the PDCCH is monitored for DCI for blind retransmission of the DL data and, when DCI is received, the corresponding DL data is received accordingly.

In step S230, the received data is decoded by the circuitry 120 and it is determined whether the decoding of the received DL data was successful or not. In a case where the DL data could not be decoded successfully (No in step S230), it is proceeded to step S210 where it is again determined whether the drx-RetransmissionTimer is (still) running. Otherwise, i.e., when it is determined that the received data could be decoded successfully (Yes in step S230), it is proceeded to step S240.

In step S240, the drx-RetransmissionTimer corresponding to the current HARQ process is terminated and, subsequently, the method ends.

Although the drx-RetransmissionTimer is terminated once the DL data could be decoded successfully, the present disclosure is not limited thereto, and said timer could expire after its configured runtime.

In the described variations of the embodiment, a single timer is utilized to set the monitoring period, during which PDCCH is monitored for reception of DCI for blind retransmissions. In particular, the duration of the monitoring period is configured so as to cover all blind retransmissions.

As the timer for implementing the monitoring period, the drx-InactivityTimer or the drx-RetransmissionTimer may be used. Note that, in contrast to the drx-Inactivity Timer, a drx-RetransmissionTimer may be initiated for each of a plurality of HARQ processes or data reception processes. That is, a drx-RetransmissionTimer may be terminated once the corresponding DL data could be decoded successfully. On the other hand, the drx-InactivityTimer can only be terminated when no further HARQ process is active.

Further, note that the present disclosure is not limited to utilizing the drx-InactivityTimer or the drx-RetransmissionTimer for setting the monitoring period, and another timer may be used. For instance, a new timer could be introduced.

In a further embodiment, which is described in the following with reference to FIGS. 18 to 22, the UE transceiver 110 further receives a termination indicator indicating termination of the timer defining the monitoring period for retransmissions. Subsequently, the circuitry 120 terminates the monitoring period when the termination indicator is received.

Just as in the above-described embodiment, the duration of the monitoring period or, more specifically, the runtime of the timer defining the duration of the period for monitoring the PDCCH for retransmissions, may be configured, for instance, by RRC, MAC CE or DCI signaling.

For instance, the monitoring period may be terminated when an explicit indication to stop the timer is received. This may be performed via MAC CE upon reception of the last retransmission of the DL or transmission of UL data, for instance.

Alternatively, an implicit indication could trigger the circuitry 130 to stop the timer and, thus, to terminate the monitoring period for monitoring PDCCH. For instance, an implicit indication to terminate the monitoring period could be implemented as an indication in the last transmission in the last PDCCH transmission, where one bit may be used to indicate whether it is the last retransmission or not. For instance, a last bit value of 1 may indicate the last retransmission, whereas a last bit value of 0 may indicate further retransmissions. In this case, the UE 100 would terminate the monitoring period in a case where the last bit of a received indicates a value of 1.

With this approach, even though additional signaling is required, the UE may terminate the monitoring period by stopping the respective timer when the last DCI is received, thereby preventing unnecessary monitoring of the PDCCH and, thus, reducing the device's power consumption.

In a first variation, the drx-RetransmissionTimer is disabled. In other words, UE does not start or restart the drx-RetransmissionTimer when received data could not be decoded successfully. Instead, the drx-InactivityTimer is started when decoding of data received in a first transmission could not be decoded successfully. Further, when an indicator (i.e., the termination indicator) indicating termination of the monitoring period is received, the monitoring period is terminated by stopping the respective drx-InactivityTimer. This procedure is illustrated in FIGS. 18 and 19.

Figure 18:
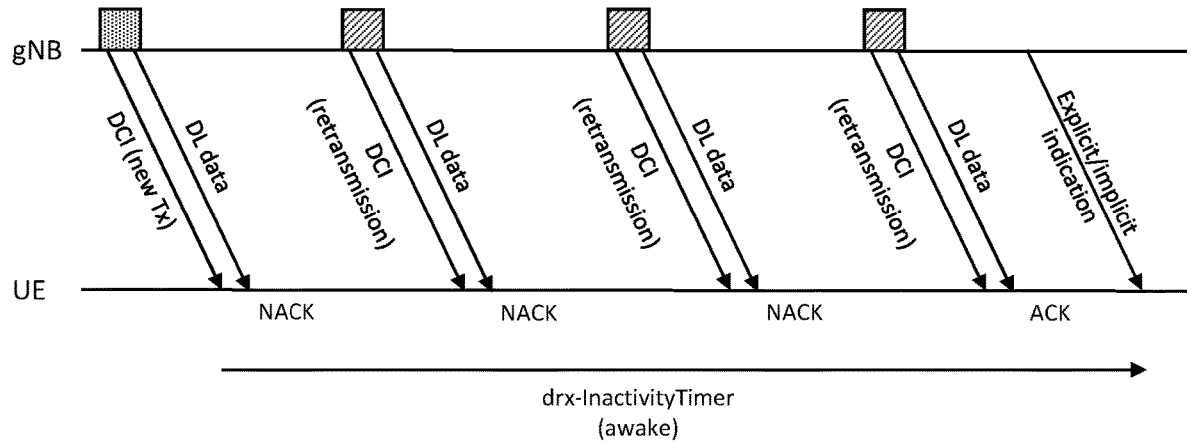
FIG. 18 illustrates the chronological sequence of transmissions between a scheduling device and a transceiver device when the monitoring period is set utilizing the drx-InactivityTimer and a termination indicator is received.
Figure 19:
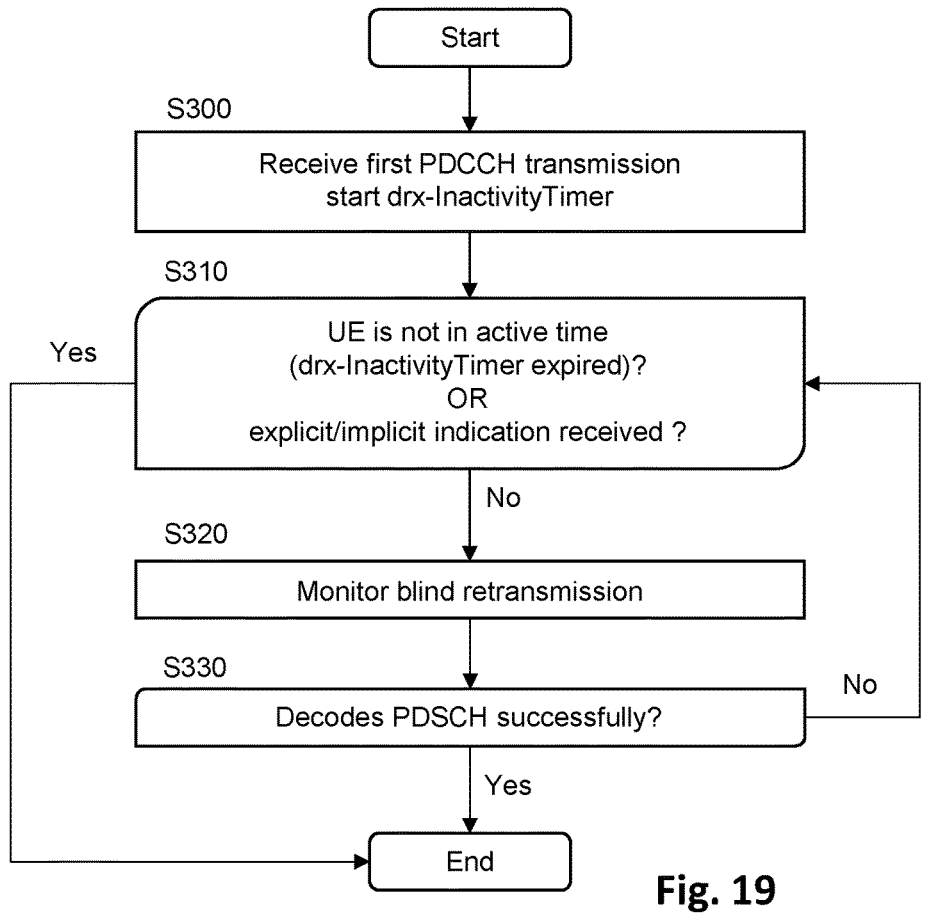
FIG. 19 shows the steps of a method performed by a transceiver device when the monitoring period is set utilizing the drx-InactivityTimer and a termination indicator is received.

FIG. 18 illustrates the chronological sequence of transmissions between gNB 200 (scheduling device) and UE 100 (transceiver device) when the monitoring period is set utilizing the drx-InactivityTimer and a termination indicator is received. FIG. 19 shows the steps of a method performed by UE 100 when the monitoring period is set utilizing the drx-InactivityTimer and a termination indicator is received.

In step S300, a first PDCCH transmission is received and the drx-InactivityTimer is started.

In step S310, it is determined whether the UE is in active time. Or not In other words, it is determined whether the drx-InactivityTimer has expired or not. Further, it is determined whether a termination indicator indicating a termination of the monitoring period is received. The termination indicator may be transmitted explicitly or implicitly, as described above. In a case where the UE 100 is not in active time or a termination indicator has been received (Yes in step S310) the method ends. On the other hand, in a case where the UE 100 is in active time and no termination indicator has been received (No in S310), the process proceeds to step S320.

In step S320, the UE 100 monitors the PDCCH for reception of DCI for a retransmission of DL data. That is, the PDCCH is monitored for reception of second control information. When the DL data is received, it is determined in steps S330 whether the received data could be decoded successfully or not. In a case where the data received over PDSCH could be decoded successfully (Yes in step S330), the method ends. On the other hand, in a case where the received data could not be decoded successfully (No in step S330), it is proceeded to step S310.

Note that even when the UE successfully decodes the received data, the PDCCH is further monitored until the drx-InactivityTimer expires or explicit/implicit indication is received from gNB. The "end" in the described method does not imply termination of all timers.

Further, note that a termination indicator indicating termination of the monitoring period may be received by UE 100 in a corresponding procedure for blind retransmission of UL data.

In a second variation, the drx-InactivityTimer is initiated when DCI for a first transmission of DL data is received. Further, the monitoring period is initiated by starting the drx-RetransmissionTimer when the data received in the first transmission has been decoded. Further, the drx-RetransmissionTimer is stopped upon reception of an implicit or explicit indication. This procedure is illustrated in FIGS. 20 and 21.

Figure 20:
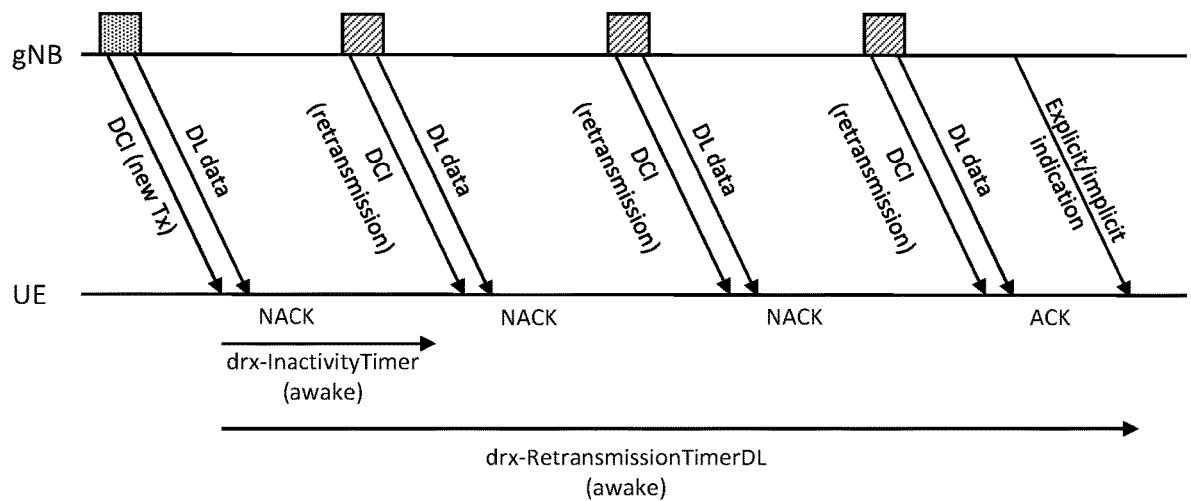
FIG. 20 illustrates the chronological sequence of transmissions between a scheduling device and a transceiver device when the monitoring period is set utilizing the drx-RetransmissionTimer and a termination indicator is received.
Figure 21:
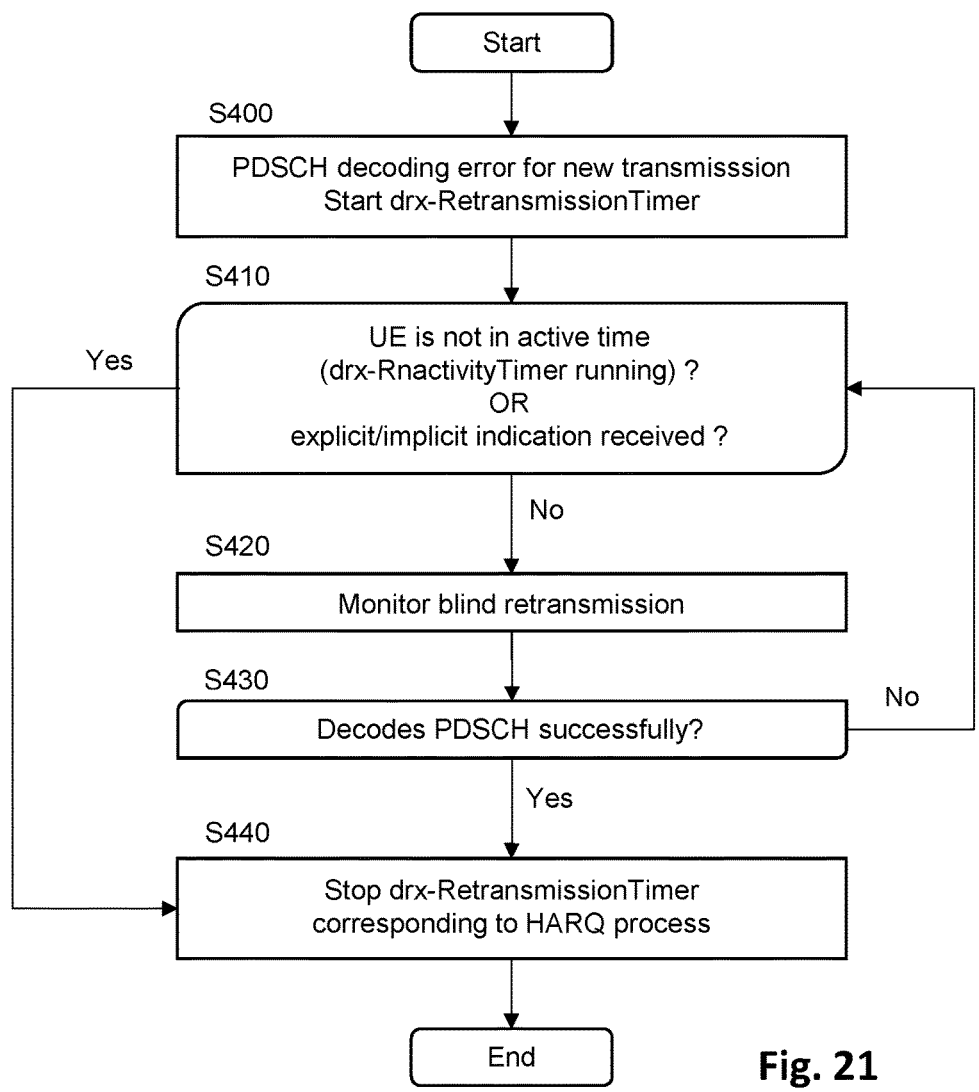
FIG. 21 shows the steps of a method performed by a transceiver device when the monitoring period is set utilizing the drx-RetransmissionTimer and a termination indicator is received.
Figure 22:
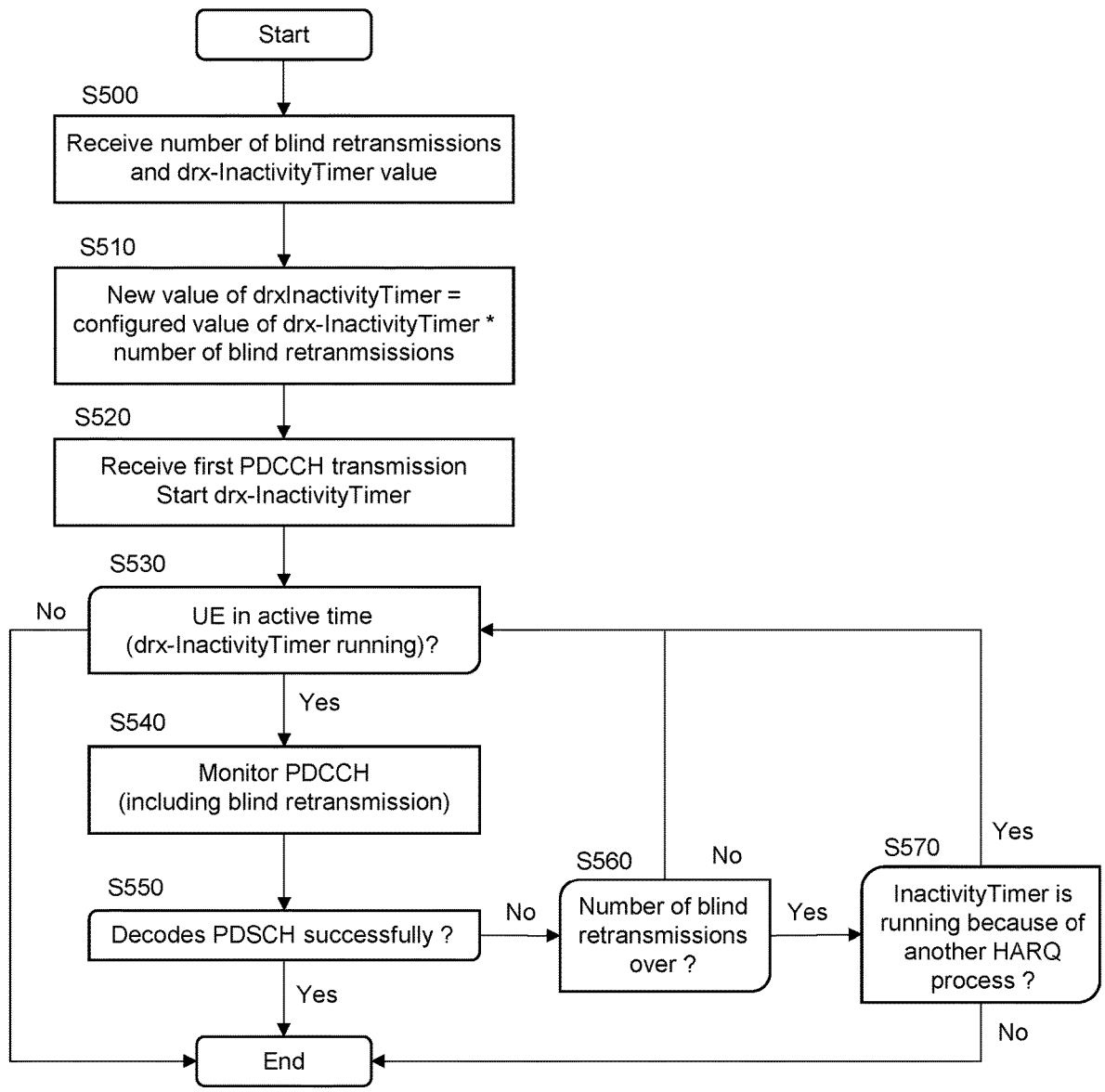
FIG. 22 is a flowchart illustrating a method according to an embodiment, wherein a retransmission indicator indicating a number of blind retransmissions is received and the drx-InactivityTimer is utilized to set the monitoring period.

FIG. 20 illustrates the chronological sequence of transmissions between gNB 200 (scheduling device) and UE 100 (transceiver device) when the monitoring period is set utilizing the drx-RetransmissionTimer and a termination indicator is received. FIG. 21 shows the steps of a method performed by UE 100 when the monitoring period is set utilizing the drx-RetransmissionTimer and a termination indicator is received.

After having received DCI for a first transmission of DL data, the drx-InactivityTimer is started according to a configured DRX process. Further, the corresponding DL data is received via PDSCH and decoded.

In step S400, when the received data could not be decoded successfully, that is, when a PDSCH decoding error for a first transmission occurs, the drx-RetransmissionTimer is started.

In step S410, it is determined whether the UE 100 is in active time or not. In other words, it is determined whether the drx-RetransmissionTimer is running or not. Further, it is determined whether or not a termination indicator indicating termination of the monitoring period has been received. In a case where UE 100 is not in active time or a termination indicator has been received (Yes in step S410), it is proceeded to step S440. On the other hand, in a case where the UE is in active time and a termination indicator has not been received, it is proceeded to step S420.

In step S420 the PDCCH is monitored for DCI for retransmission of the DL data.

When the DL data is received according to received DCI, it is determined whether the received data could be decoded successfully or not in step S430. When the received data could not be decoded successfully (No is step S430), it is proceeded to step S410. On the other hand, in a case where the received data could be decoded successfully (Yes in step S430), it is proceeded to step S440.

In step S440, the drx-RetransmissionTimer corresponding to the current HARQ process is terminated and the method ends.

In the described variations of the embodiment, an explicit or implicit indication (termination indicator) to stop the timer defining the monitoring period during which PDCCH is monitored for second control information is received. Upon reception of the termination indicator, the monitoring period is terminated by stopping respective timer.

With this approach, gNB 200 may actively trigger termination of the monitoring period when, for instance, a further retransmission of DL data is not intended and, in consequence, the power consumption of the UE is decreased.

In a further embodiment, gNB 200 transmits a duration indicator indicating the duration of the monitoring period. For instance, the duration of the monitoring period may be indicated as a runtime of a dedicated timer. Further, gNB 200 transmits a retransmission indicator indicating the number of retransmissions to the UE 100.

The UE 100, upon reception of the runtime value and indication of the number of retransmissions, extends the actual timer runtime value to be used as a multiple of the number of retransmission. In other words, in a case where a certain number of retransmissions is indicated by gNB 200 and a certain timer runtime value is configured, the runtime of a timer dedicated to defining the duration of the monitoring period is calculated by multiplication of the configured runtime with the number of retransmissions. After reception of the first transmission, the UE 100 starts the timer with the calculated extended runtime value.

In particular, depending on whether the number of retransmissions is configured semi-statically (for instance, via RRC) or dynamically (for instance, via MAC CE or DCI), the number of blind retransmissions can also be indicated semi-statically or dynamically.

With this approach, the monitoring period may terminate when the last transmission has been received.

Note that different HARQ processes may be configured independently with the number of blind retransmissions and DRX timer values (drx-InactivityTimer and drx-RetransmissionTimer, for instance). The dynamic value of blind retransmissions and DRX timers can be configured, for instance, via DCI signaling.

In a first variation, the drx-RetransmissionTimer is disabled such that the UE 100 does not start the drx-RetransmissionTimer upon reception of retransmissions. Instead, the drx-InactivityTimer is initiated with the calculated runtime when the first PDCCH transmission is received. The timer may be stopped when it is determined that the last retransmission has been received and the inactivity timer is not running due to another HARQ process. Note that the present disclosure is not limited to the timer being stopped, but it may run until it expires. Details of the procedure are described with reference to FIG. 22.

In step S500, a retransmission indicator indicating the number of blind retransmissions is received. Further, a duration indicator indicating a runtime of the drx-InactivityTimer is received by the UE 100.

In step S510, a new runtime value of the drx-InactivityTimer is calculated as the product of the configured runtime value of the drx-InactivityTimer and the number of blind retransmissions.

In step S520, a first PDCCH transmission is received and the drx-InactivityTimer is initiated with the new calculated runtime.

In step S530, it is determined whether the UE 100 is in active time. In other words, it is determined whether or not the drx-InactivityTimer is running. In a case where it is determined that the drx-InactivityTimer is not running, i.e., the UE 100 is not in active time, (No in step S530), the process ends. In a case where it is determined that UE 100 is in active time, it is proceeded to step S540.

In step S540, the PDCCH is monitored for reception of DCI for retransmission (second control information) of DL data.

If said DCI and respective DL data has been received, it is determined whether or not the received DL data could be decoded successfully or not in step S550. In a case where the DL data received via PDSCH could be decoded successfully (Yes in S550), the method ends. When it is determined that the received DL data could not be decoded successfully, it is proceeded to step S560.

In step S560, it is determined whether the number of blind retransmissions is over. In other words, the UE 100 keeps track of the number of received blind retransmissions and compares said number with the indicated number of blind retransmissions received in step S500. In a case where the number of blind retransmissions is not over (No in step S560), further retransmissions can be expected and, thus, the process proceeds to step S530. On the other hand, in a case where the number of blind retransmissions is over (Yes in step S560), it is proceeded to step S570.

In step S570, it is determined whether the drx-InactivityTimer is running because of another HARQ process. In a case where the drx-InactivityTimer is not running because of another HARQ process (No in step S570), the timer is stopped and the method ends. In a case where the drx-InactivityTimer is running because of another HARQ process, it is proceeded to step S530.

Figure 23:
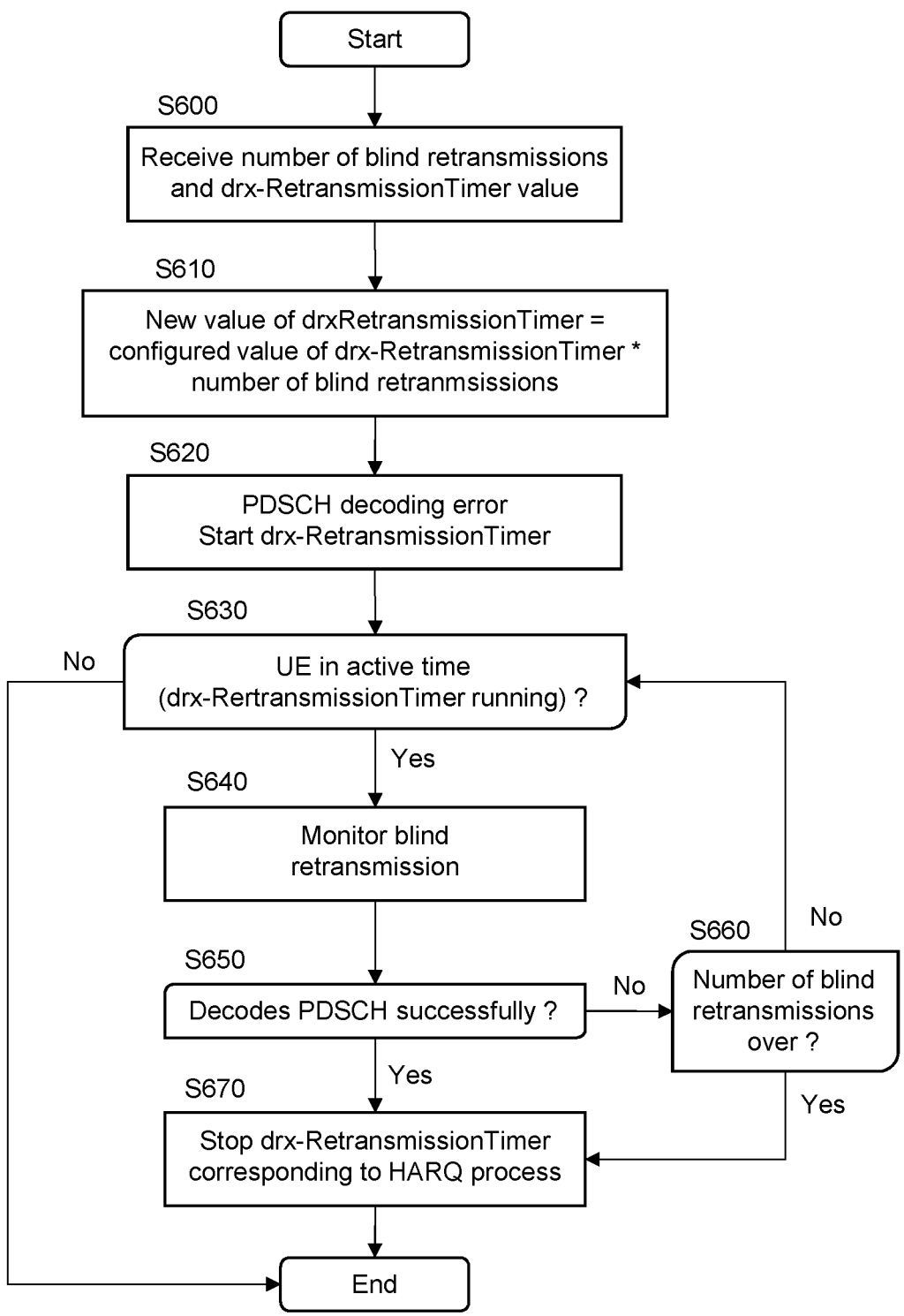
FIG. 23 is a flowchart illustrating a method according to an embodiment, wherein a retransmission indicator indicating a number of blind retransmissions is received and the drx-RetransmissionTimer is utilized to set the monitoring period.

In a second variation, the drx-RetransmissionTimer is initiated with the calculated runtime value when an error occurs during decoding of data from a first transmission. Said timer may be stopped when data received in a blind retransmission could be decoded successfully or after the indicated number of retransmissions. Details of the procedure are described with reference to FIG. 23.

In step S600, a retransmission indicator indicating of the number of blind retransmissions. Further, a duration indicator indicating a duration of the monitoring period is received. For instance, the duration indicator may indicate a runtime value of the drx-RetransmissionTimer.

In step S610, a new runtime value of the drx-RetransmissionTimer is calculated as the product of the received runtime value of the drx-RetransmissionTimer and the number of blind retransmissions.

In step S620, a first PDCCH transmission is received and the drx-retransmissionTimer is initiated with the calculated runtime.

In step S630, it is determined whether the UE 100 is in active time. In other words, it is determined whether or not the drx-RetransmissionTimer is running. In a case where it is determined that the drx-RetransmissionTimer is not running, i.e., the UE 100 is not in active time, (No in step S630), the process ends. In a case where it is determined that the UE 100 is in active time, it is proceeded to step S640.

In step S640, the PDCCH is monitored for reception of DCI for retransmission of DL data (second control information).

When said DCI and respective DL data has been received, it is determined whether or not the received DL data could be decoded successfully or not in step S650. In a case where the DL data received via PDSCH could be decoded successfully (Yes in S650), the process proceeds to step S670. If it is determined that the received DL data could not be decoded successfully, the process proceeds to step S660.

In step S660, it is determined whether the number of blind retransmissions is over. In other words, the UE 100 keeps track of the number of received blind retransmissions and compares said number with the indicated number of blind retransmissions received in step S600. In a case where the number of blind retransmissions is not over (No in step S660), further retransmissions can be expected and, thus, the process proceeds to step S630. On the other hand, in a case where the number of blind retransmissions is over (Yes in step S660), it is proceeded to step S670.

In step S670, the drx-RetransmissionTimer corresponding to the current HARQ process is stopped and, subsequently, the method ends.

According to the described variations of the embodiment, gNB transmits a retransmission indicator indicating the number of retransmissions to the UE 100. Further, a duration indicator indicating a runtime of a dedicated timer is received by the UE 100. The UE 100 subsequently calculates the duration of the monitoring period as proportional to the indicated number of blind retransmissions. Specifically, the duration of the monitoring period is set as the product of the indicated number of blind retransmissions and the indicated runtime of respective timer.

In a further embodiment, the monitoring period is set by setting one or more partial monitoring periods, during which the transceiver 110 of the transceiver device 100 (the UE) monitors the PDCCH for DCI for a blind retransmission of data. This is performed, for instance, by restarting a dedicated timer whenever DCI is received over the PDCCH, regardless of whether the received DCI relates to a first transmission of data or a blind retransmission of said data.

Note that the partial monitoring periods may start immediately after reception of DCI or after decoding of the DL data received over the PDSCH.

In this embodiment, the runtime value of the timer is set so as to be sufficient for the UE 100 to be in active time when receiving the next retransmission.

When staring a respective timer after unsuccessful decoding of received data and not starting the respective timer in a case of successful decoding of said data, power consumption of the UE 100 can be reduced while at the same time it is ensured that blind retransmissions are received if required.

According to a first variation, the drx-RetransmissionTimer is disabled such that the UE 100 does not start or restart drx-RetransmissionTimer upon receiving a retransmission. Instead, drx-InactivityTimer is initiated each time a transmission or retransmission is received. Details of the procedure are described with reference to FIGS. 24 and 25.

Figure 24:
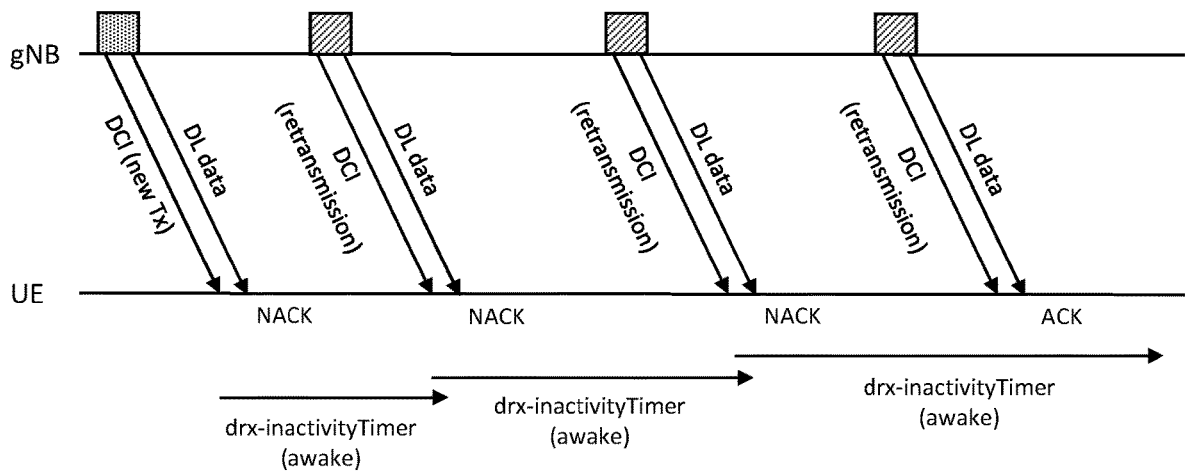
FIG. 24 illustrates the chronological sequence of transmissions between a scheduling device and a transceiver device when the monitoring period is set by setting partial monitoring periods using the drx-InactivityTimer.
Figure 25:
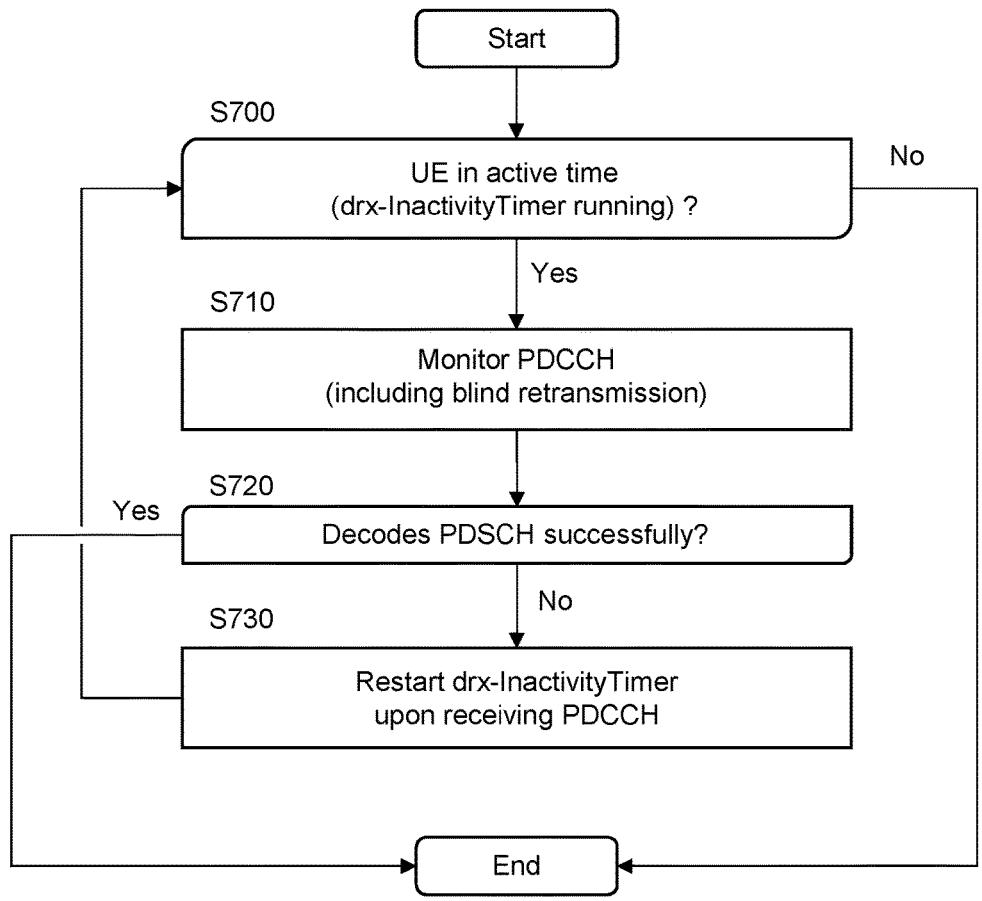
FIG. 25 shows the steps of a method performed by a transceiver device when the monitoring period is set by setting partial monitoring periods using the drx-InactivityTimer.

FIG. 24 illustrates the chronological sequence of transmissions between gNB 200 (scheduling device) and UE 100 (transceiver device) when the monitoring period is set by setting partial monitoring periods using the drx-InactivityTimer. FIG. 25 shows the steps of a method performed by UE 100 when the monitoring period is set by setting partial monitoring periods using the drx-InactivityTimer.

As illustrated in FIG. 24, each time a PDCCH transmission or retransmission is received by the UE 100, the drx-InactivityTimer is initiated. In a case where received data could be successfully decoded (ACK for the last transmission illustrated in FIG. 24), the drx-InactivityTimer is not restarted.

As illustrated in FIG. 25, in step S700, it is determined whether the UE 100 is in active time. In other words, it is determined whether or not the drx-InactivityTimer is running. In a case where the drx-InactivityTimer is not running (No in step S700), the method ends. In a case, where the drx-InactivityTimer is running (Yes in step S710), it is proceeded to step S710.

In step S710, the PDCCH is monitored for reception of DCI for a blind retransmission of the DL data.

When DCI and respective DL data are received, it is determined in step S720 whether the received DL data could be decoded successfully or not. In a case where the data received via PDSCH could be decoded (Yes in step S720), the method ends. In a case where the received DL data could not be decoded successfully (No in step S720), it is proceeded to step S730.

In step S730, as soon as DCI for a blind retransmission of the DL data is received via the PDCCH, the drx-InactivityTimer is restarted and it is proceeded to step S700.

According to a second variation, UE 100 starts the drx-RetransmissionTimer each time data received in a retransmission could not be decoded successfully. Details of the procedure are described with reference to FIGS. 26 and 27.

Figure 26:
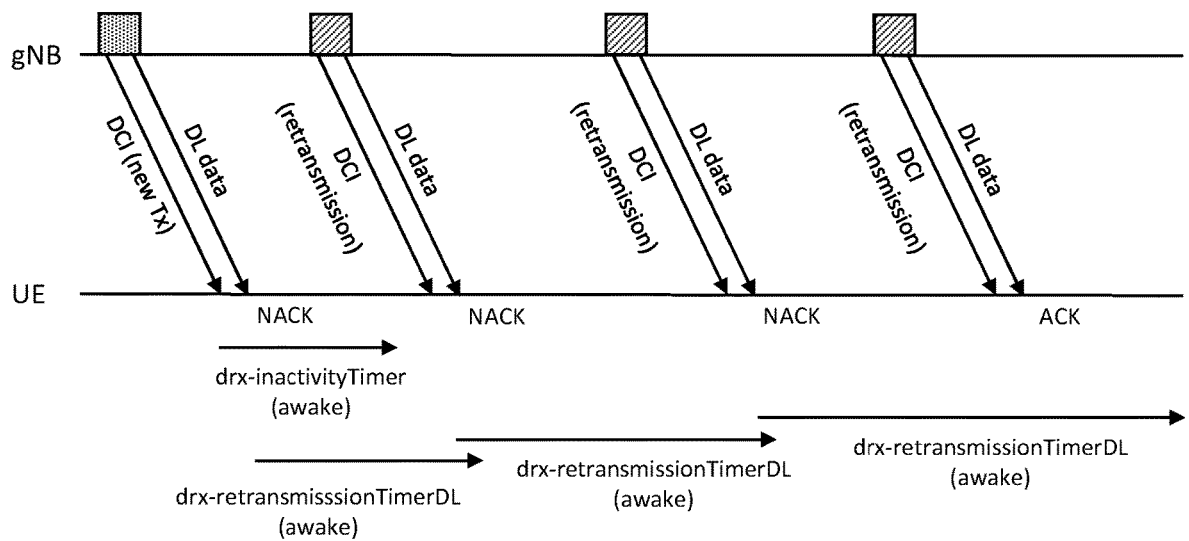
FIG. 26 illustrates the chronological sequence of transmissions between a scheduling device and a transceiver device) when the monitoring period is set by setting partial monitoring periods using the drx-RetransmissionTimer.
Figure 27:
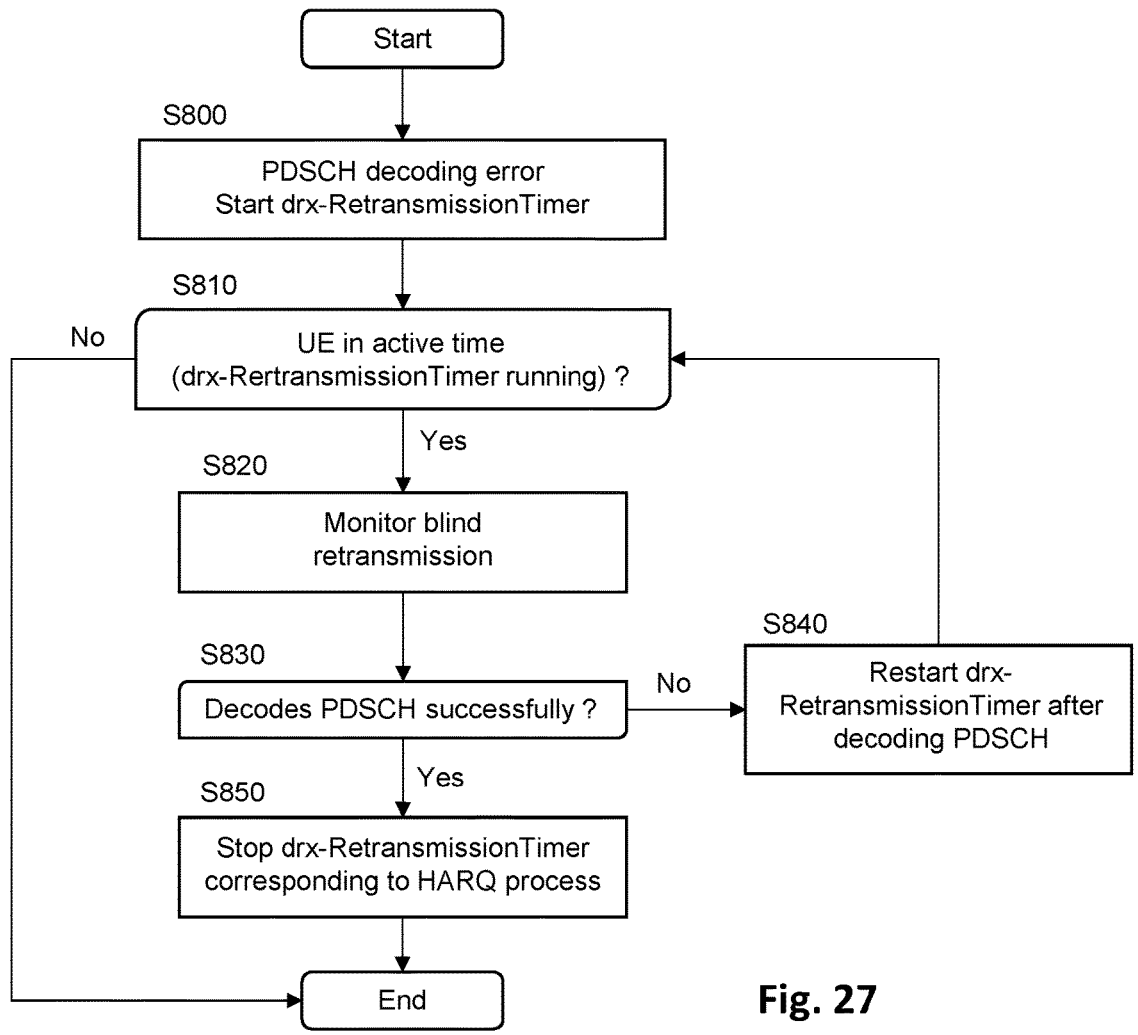
FIG. 27 shows the steps of a method performed by a transceiver device when the monitoring period is set by setting partial monitoring periods using the drx-RetransmissionTimer.

FIG. 26 illustrates the chronological sequence of transmissions between gNB 200 (scheduling device) and UE 100 (transceiver device) when the monitoring period is set by setting partial monitoring periods using the drx-RetransmissionTimer. FIG. 27 shows the steps of a method performed by UE 100 when the monitoring period is set by setting partial monitoring periods using the drx-RetransmissionTimer.

As can be seen from FIG. 26, once DCI for a new transmission of DL data is received, the drx-InactivityTimer is started according to a configured DRX process, for instance. When the respective DL data is received and could not be decoded successfully, the drx-RetransmissionTimer is initiated and the PDCCH is monitored for reception of DCI for retransmission of the DL data. Each time the DL data is received but cannot be decoded successfully, the drx-RetransmissionTimer is (re)started for reception of the following blind retransmission. When the data received over the PDSCH is successfully decoded, the drx-RetransmissionTimer may be stopped, as illustrated by the successful (ACK) decoding of the data received in the last blind retransmission.

As can be seen from FIG. 27, in step S800, the drx-RetransmissionTimer is started when a decoding error occurred for data received via the PDSCH.

In step S810, it is determined whether or not the UE 100 is in active state. In other words, it is determined whether or not the drx-RetransmissionTimer is running. In a case where the drx-RetransmissionTimer is not running (No in step S810), the method ends. In a case where the UE 100 is in active state and the drx-RetransmissionTimer is running (Yes in step S820), it is proceeded to step S820.

In step S820, the PDCCH is monitored for reception of DCI for retransmission of the DL data.

In step S830, it is determined whether the DL data received via the PDSCH could be decoded successfully. In a case where the data could be decoded successfully (Yes in step S830), it is proceeded to step S850. In a case where it is determined that the data could not be decoded successfully (No in step S830), it is proceeded to step S840.

In step S840, the drx-RetransmissionTimer is restarted (after decoding the received data) and the method continues in step S810.

In step S850, the drx-RetransmissionTimer corresponding to the current HARQ process is stopped and, subsequently, the method ends.

According to the described variations of the embodiment, the monitoring period is set by the circuitry 130 of the transceiver device 100 by initiating partial monitoring period each time control information or second control information is received.

Note that the circuitry may initiate the partial monitoring period after decoding received data unsuccessfully. With this approach, a partial monitoring period is not initiated in a case of successful decoding and, thus, the PDCCH is not monitored unnecessarily.

In a further embodiment, the runtime of the timer for the partial monitoring period is sufficiently long for UE 100 to be active when DCI for a retransmission is transmitted. Further, gNB indicates the number of blind retransmissions by transmitting a respective retransmission indicator indicating the number of blind retransmissions. The UE 100 (re)starts a respective timer each time DCI for a transmission or retransmission is received via the PDCCH.

Note that the timer may start immediately after receiving DCI or after decoding of respective received DL data.

Further, before starting the monitoring period (by initiating a respective timer), it is determined whether the number of received retransmissions is equal to the number of retransmissions as indicated by gNB 200. In a case where the number of received retransmissions is equal to (or larger than) the indicated number of retransmissions, the dedicated timer is not initiated.

With this approach, it is avoided that UE 100 monitors the PDCCH in a case where no blind retransmission is to be expected.

Note that, depending on whether the number of blind retransmissions are configured semi-statically or dynamically, the number of blind retransmissions may be indicated semi-statically or dynamically, respectively. For instance, for semi-static indication, RRC signaling may be utilized, and for dynamic indication, MAC CE or DCI may be utilized.

Further, note that different HARQ processes can be configured independently with a number of blind retransmissions and DRX timer values (monitoring period durations), including drx-RetransmissionTimer and drx-InactivityTimer. The dynamic value of the number of blind retransmissions can be configured or indicated by DCI signaling.

In a first variation, the monitoring period is set by initiating partial monitoring periods using the drx-InactivityTimer, which is started every time the DL data is received via the PDSCH, could not be decoded successfully and the last blind retransmission has not yet been performed according to the indicated number of blind retransmission. Further, the drx-RetransmissionTimer is disabled according to this variation of the embodiment.

Figure 28:
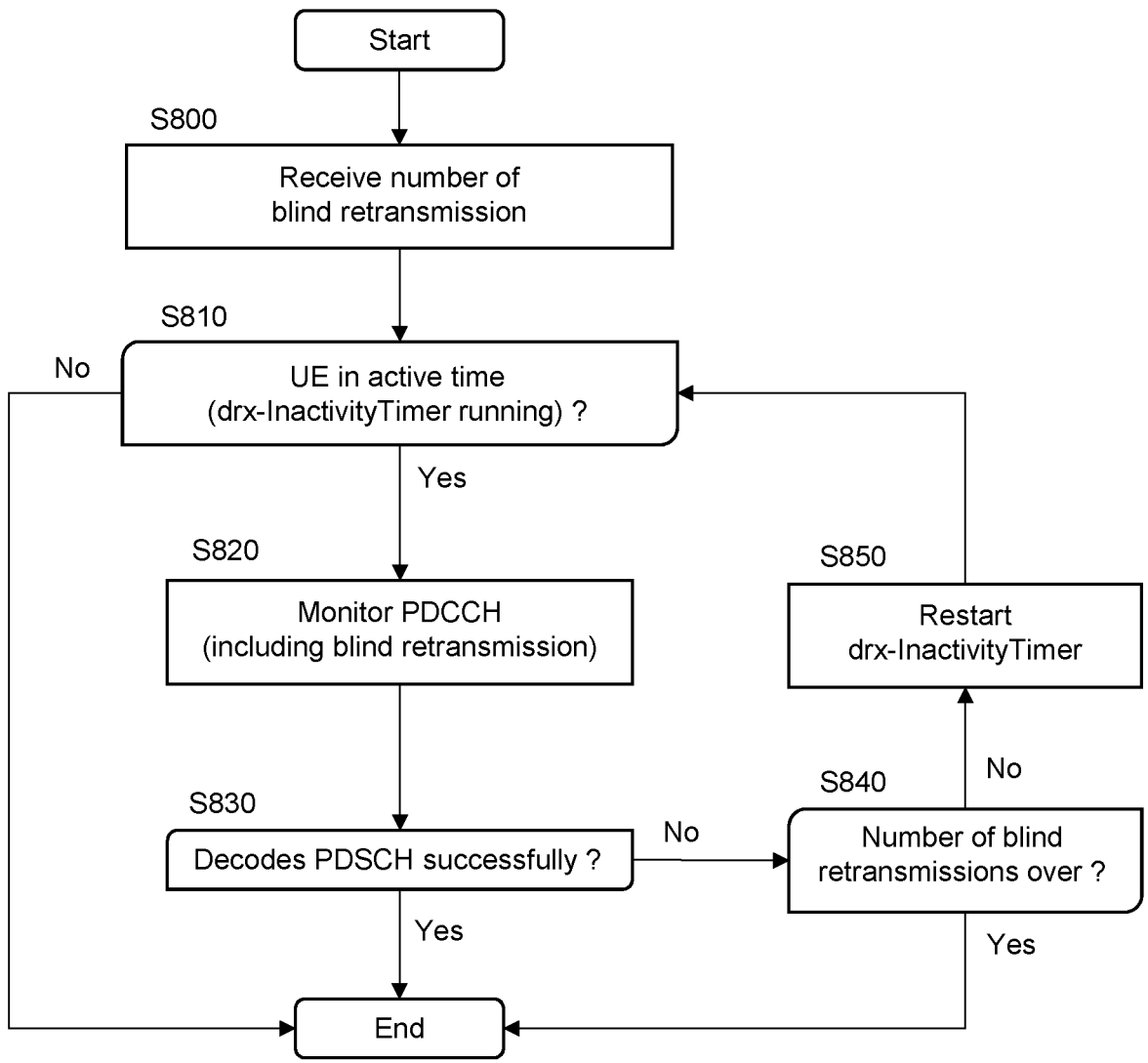
FIG. 28 shows a flowchart illustrating the steps of the method performed by a transceiver device when the monitoring period is set by setting partial monitoring periods using the drx-InactivityTimer and the number of blind retransmissions is indicated.

FIG. 28 shows a flowchart illustrating the steps of the method performed by the UE 100 when the monitoring period is set by setting partial monitoring periods using the drx-InactivityTimer and the number of blind retransmissions is indicated.

In step S800, a retransmission indicator indicating the number of blind retransmissions is received from gNB 200.

In step S810, it is determined whether or not the UE 100 is in active time. In other words, it is determined whether the drx-InactivityTimer is running or not. In a case where the drx-InactivityTimer is not running (No in step S810), i.e., the UE is not in active time, the method ends. In a case where the UE 100 is in active time (Yes in step S820), it is continued to step S820.

In step S820, UE 100 monitors the PDCCH for reception of DCI for a blind retransmission.

After having received DCI for transmission or retransmission of DL data, the DL data is received and it is determined whether the received DL data can be decoded successfully or not in step S830. In a case where the DL data could be decoded successfully (Yes in step S830), the method ends. In a case where the DL data could not be decoded successfully (No in step S830), it is continued to step S840.

In step S840, it is determined whether the number of blind retransmissions is over or not. In other words, UE 100 keeps track of the number of received blind retransmissions and determines whether the number of received blind retransmissions is equal to the number of blind retransmissions indicated by the indicator received in step S800. If the number of blind retransmissions is over (Yes in step S840), the method ends. In a case where the number of blind retransmissions is not over (No in step S840) it is continued to step S850.

In step S850, the drx-InactivityTimer is restarted and it is continued to step S810.

In a second variation, the monitoring period is set by initiating partial monitoring periods using the drx-RetransmissionTimer, which is started every time DL data received via the PDSCH could not be decoded successfully and the last blind retransmission has not yet been performed according to the indicated number of blind retransmission.

Figure 29:
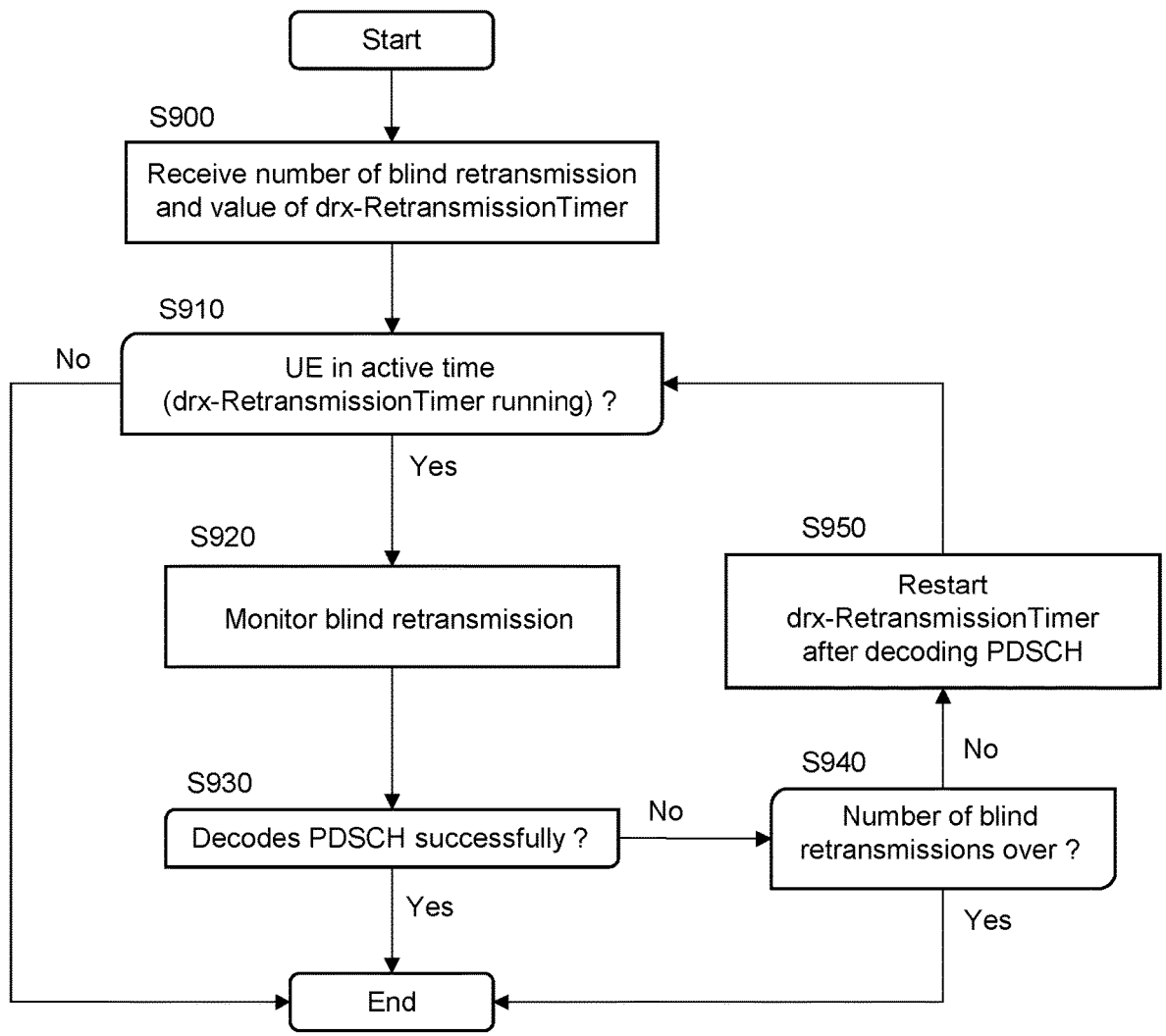
FIG. 29 shows a flowchart illustrating the steps of the method performed by a transceiver device when the monitoring period is set by setting partial monitoring periods using the drx-RetransmissionTimer and the number of blind retransmissions is indicated.

FIG. 29 shows a flowchart illustrating the steps of the method performed by the UE 100 when the monitoring period is set by setting partial monitoring periods using the drx-RetransmissionTimer and the number of blind retransmissions is indicated.

In step S900, a retransmission indicator indicating the number of blind retransmissions is received from gNB 200. Further, a runtime value of the drx-RetransmissionTimer is received. Details on the signaling of the number of blind retransmissions and the timer runtime will be given further below.

In step S910, it is determined whether or not the UE 100 is in active time. In other words, it is determined whether the drx-RetransmissionTimer is running or not. In a case where the drx-RetransmissionTimer is not running (No in step S910), i.e., the UE is not in active time, the method ends. In a case where the UE 100 is in active time (Yes in step S920), it is continued to step S920.

In step S920, UE 100 monitors the PDCCH for reception of DCI for a blind retransmission.

After having received DCI for retransmission of DL data, the DL data is received and it is determined whether the received DL data can be decoded successfully or not in step S930. In a case where the DL data could be decoded successfully (Yes in step S930), the method ends. In a case where the DL data could not be decoded successfully (No in step S930), it is continued to step S940.

In step S940, it is determined whether the number of blind retransmissions is over or not. In other words, UE 100 keeps track of the number of received blind retransmissions and determines whether the number of received blind retransmissions is equal to the number of blind retransmissions indicated by the indicator received in step S900. If the number of blind retransmissions is over (Yes in step S940), the method ends. In a case where the number of blind retransmissions is not over (No in step S940) it is continued to step S950.

In step S850, the drx-RetransmissionTimer is restarted (after decoding of the DL data received via the PDSCH) and it is continued to step S910.

According to the variations of the embodiment, the transceiver device 100 receives a retransmission indicator indicating a number of retransmissions. Further, the monitoring period is set by initiating one or more partial monitoring periods. This is performed, for instance, by starting respective timers. Only in a case where the indicated number of retransmissions is not yet over, said timer is started.

With this approach, the transceiver device 100 is prevented from monitoring the PDCCH for DCI for a blind retransmission of DL data in a case where gNB 200 will not retransmit said data. Thus, the power consumption of the transceiver device is reduced while at the same time it is ensured that the transceiver device 100 is in active time when second control information is transmitted or corresponding DL data is retransmitted.

In the following, details on possible configuration paths of the number of blind retransmissions will be described.

As already indicated above, the number of blind retransmissions may be configured by RRC message. The number of blind retransmission may be configured in a DRX configuration element, as shown in the following.

DRX-Config Information Element

```
-- ASN1START
-- TAG-DRX-CONFIG-START
DRX-Config ::=         SEQUENCE {
    drx-onDurationTimer    CHOICE {
        subMilliSeconds INTEGER (1..31,
```

| DRX-Config Information Element |
| --- |

```
                    milliSeconds ENUMERATED {
                        ms1, ms2, ms3, ms4, ms5, ms6, ms8, ms10, ms20,
ms30,
                        ms40, ms50, ms60, ms80, ms100, ms200, ms300, ms400,
                        ms500, ms600, ms800, ms1000, ms1200, ms1600,
spare8,
                        spare7, spare6, spare5, spare4, spare3, spare2,
                        spare1 }
                    },
    drx-InactivityTimer         ENUMERATED {
                        ms0, ms1, ms2, ms3, ms4, ms5, ms6, ms8, ms10, ms20,
                        ms30, ms40, ms50, ms60, ms80, ms100, ms200, ms300,
                        ms500, ms750, ms1280, ms1920, ms2560, spare9, spare8,
                spare7, spare6, spare5, spare4, spare3, spare2, spare1},
    drx-NumberofBlindRetransmissions    INTEGER (0..8),
}
```

In particular, the number of blind retransmissions may be configured via an additional parameter, which is, in the example given above, indicated as "drx-NumberofBlindRetransmissions."

Further, the number of blind retransmission may be configured by means of MAC CE.

In NR, for example, the MAC layer may insert so-called MAC control elements (MAC CE) into transport blocks to be transmitted over a transport channel. A MAC CE is used for inband control signaling, for instance, timing advance commands or random-access response.

According to the present disclosure, however, a MAC CE may carry information on the number of blind retransmissions, wherein the MAC CE may, for example, indicate a number of blind retransmissions from 0 to 7.

Figure 30:
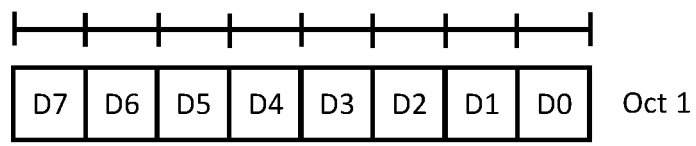
FIG. 30 schematically illustrates a MAC Control Element, CE, indicating a number of blind retransmissions according to an embodiment

FIG. 30 schematically illustrates a MAC Control Element, CE, indicating a number of blind retransmissions according to an embodiment. For example, a field $D_1$ of the MAC CE may indicate the number of blind retransmissions, wherein if $D_1$ is set to "1," may indicate that the number of blind retransmissions is i. For example, $D_1$ is associated with one blind retransmission, $D_2$ with two blind retransmissions, $D_3$ with three blind retransmissions, and so on. However, the present disclosure is not limited to one byte indicating up to seven retransmissions, and a larger number of blind retransmissions may be configured by MAC CE.

Further, the number of blind retransmissions may be configured by DCI, wherein, for example, the number of blind retransmissions may be signaled using three bits for indicating up to eight blind retransmissions.

In the following, details on possible configuration paths of a timer runtime are given.

As already indicated above, the runtime of a timer may be configured by RRC message. The timer runtime may be configured in a DRX configuration element, as shown in the following.

| DRX-Config Information Element |
| --- |

```
-- ASN1START
-- TAG-DRX-CONFIG-START
DRX-Config ::=              SEQUENCE {
    drx-onDurationTimer         CHOICE {
                        subMilliSeconds INTEGER (1..31,
                        milliSeconds ENUMERATED {
                            ms1, ms2, ms3, ms4, ms5, ms6, ms8, ms10, ms20,
ms30,
                            ms40, ms50, ms60, ms80, ms100, ms200, ms300, ms400,
                            ms500, ms600, ms800, ms1000, ms1200, ms1600,
spare8,
                            spare7, spare6, spare5, spare4, spare3, spare2,
                            spare1 }
                        },
    drx-InactivityTimer         ENUMERATED {
                        ms0, ms1, ms2, ms3, ms4, ms5, ms6, ms8, ms10, ms20,
                        ms30, ms40, ms50, ms60, ms80, ms100, ms200, ms300,
                        ms500, ms750, ms1280, ms1920, ms2560, spare9, spare8,
                spare7, spare6, spare5, spare4, spare3, spare2, spare1},
    drx-RetransmissionTimerDL       ENUMERATED {
                        s10, s11, s12, s14, s16, s18, s116, s124, s133, s140,
                        s164, s180, s196, s1112, s11128, s1160, s1320,
spare15,
                        spare14, spare13, spare12, spare11, spare10, spare9,
                        spare8, spare7, spare6, spare5, spare4, spare3,
spare2,
                        spare1},
    drx-RetransmissionTimerUL       ENUMERATED {
                        s10, s11, s12, s14, s16, s18, s116, s124, s133, s140,
                        s164, s180, s196, s1112, s1128,3 s1160, s1320,
```

| DRX-Config Information Element |
|---|
| spare15, |
| spare14, spare13, spare12, spare11, spare10, spare9, spare8, spare7, spare6, spare5, spare4, spare3, |
| spare2, |
| spare1 }, |

In particular, the runtime of the timers may be configured via the parameters drx-InactivityTimer, drx-RetransmissionTimerDL and drx-RetransmissionTimerUL. That, is, each timer runtime value is associated with an index.

Further, the timer value may be indicated by MAC CE, as illustrated in FIG. 30, for example. In this case, the MAC CE may indicate an index value for respective timer. When the MAC CE is received by the UE, the timer value corresponding to the index indicated by the MAC CE may be applied for the timer dedicated to the monitoring period for monitoring PDCCH for DCI of blind retransmissions.

Alternatively, the time value may be indicated by DCI, wherein DCI indicates an index number and US, upon reception of DCI, applies the runtime according to the index indicated by DCI.

Note that the configuration of the blind retransmissions is not limited to one of the above-described embodiments, and it may be switched between the described methods.

For example, at time t, gNB may configure a timer runtime value either vie DCI or RRC. Further, at another time t', the number of blind retransmissions may be configured via DCI. In this case, UE may derive the new timer value by multiplying the timer value with the number of blind retransmissions, as described above.

Similarly, gNB may switch in between configuration options. For example, when at time t gNB cannot configure the number of blind retransmissions, UE restarts the timer whenever decoding of received data is unsuccessful. Further, at time t', gNB may configure the number of blind retransmissions.

In the described embodiments and respective variations, the number of blind retransmissions may be configured per HARQ process of on a packet priority basis.

For instance, three blind retransmissions may be configured for HARQ process 1, whereas a single blind retransmission may be configured for HARQ process 2 and no blind retransmission may be configured for HARQ process 3.

Further, for example, the number of blind retransmissions may be configured according to a priority level of a packet to be transmitted. For instance, for a first packet having a higher priority level than a second packet, a larger number of blind retransmissions may be configured with respect to the second packet having a lower level of priority. For instance, the number of blind retransmissions may be configured as proportional to a level of priority of a packet to be transmitted.

Still further, note that different HARQ processes may be configured with different timer values. Further, in a case where a number of blind retransmissions is configured, the configured number of retransmissions may be different for different HARQ processes.

In the described embodiments and respective variations, the drx-HARQ-RTT-Timer may be either disabled or its runtime value set to zero when HARQ feedback is disabled.

Note that the methods according to the embodiments and respective variations are described for a single HARQ process. However, the present disclosure is not limited thereto. In particular, an "ending" of a method does not imply termination of all running timers.

Although the methods of the embodiments and respective variation are primarily described relating to downlink data transmitted from gNB to UE, the methods may be equally applied to transmission from UE to gNB, i.e., for transmission of uplink data.

That is, the drx-HARQ-RTT-TimerUL may be set to zero or be disabled, such that the drx-InactivityTimer and/or drx-RetransmissionTimerUL is started after having received the DCI for a first transmission or after transmission of Note that the term drx-RetransmissionTimer used in the present disclosure may refer to a drx-RetransmissionTimerDL for retransmission of downlink data or to drx-RetransmissionTimerUL for retransmission of uplink data. Further, the term drx-HARQ-RTT-Timer used in the present disclosure may refer to a drx-HARQ-RTT-TimerDL or a HARQ-RTT-TimerUL.

The present disclosure can be realized by software, hardware, or software in cooperation with hardware. Each functional block used in the description of each embodiment described above can be partly or entirely realized by an LSI (large scale integration) such as an integrated circuit (IC), and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing. If future integrated circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system having a function of communication, which is referred to as a communication apparatus.

Some non-limiting examples of such a communication apparatus include a phone (e.g., cellular (cell) phone, smart phone), a tablet, a personal computer (PC) (e.g., laptop, desktop, netbook), a camera (e.g., digital still/video camera), a digital player (digital audio/video player), a wearable device (e.g., wearable camera, smart watch, tracking device), a game console, a digital book reader, a telehealth/telemedicine (remote health and medicine) device, and a vehicle providing communication functionality (e.g., automotive, airplane, ship), and various combinations thereof.

The communication apparatus is not limited to be portable or movable, and may also include any kind of apparatus, device or system being non-portable or stationary, such as a smart home device (e.g., an appliance, lighting, smart meter, control panel), a vending machine, and any other "things" in a network of an "Internet of Things (IoT)."

The communication may include exchanging data through, for example, a cellular system, a wireless LAN system, a satellite system, etc., and various combinations thereof.

The communication apparatus may comprise a device such as a controller or a sensor which is coupled to a communication device performing a function of communication described in the present disclosure. For example, the communication apparatus may comprise a controller or a sensor that generates control signals or data signals which are used by a communication device performing a communication function of the communication apparatus.

The communication apparatus also may include an infrastructure facility, such as a base station, an access point, and any other apparatus, device or system that communicates with or controls apparatuses such as those in the above non-limiting examples.

As described above, provided are devices and methods enabling blind retransmissions while ensuring reception of said transmissions when a DRX cycle is configured.

Provided is a transceiver device, comprising a transceiver, which, in operation, receives control information over a Physical Downlink Control Channel, PDCCH, the control information indicating a scheduled transmission of data; and circuitry, which, in operation, sets a monitoring period according to a number of blind retransmissions of the data, wherein the transceiver, in operation, monitors the PDCCH during the monitoring period.

In some embodiments, the transceiver, in operation, receives the data according to the control information.

In some embodiments, the transceiver, in operation, transmits the data according to the control information.

In other words, the transceiver, in operation, may receive or transmit the data according to the control information, depending on whether the control information refers to reception or transmission of data. The advantage achieved by the present disclosure is achieved by setting the monitoring period during which the PDCCH is monitored, regardless of whether the data is transmitted or received.

In other words, the control information indicates scheduling of a blind retransmission of data. That is, the control information does not include said data but provides scheduling information for the transceiver device to receive the data or to transmit the data.

Further, a blind retransmission may be referred to as a transmission of the data previously transmitted. In particular, a blind retransmission is a retransmission of data without or regardless of feedback.

In some embodiments, the transceiver, in operation, receives second control information over the PDCCH within the monitoring period, the second control information indicating a scheduled retransmission of the data.

In some embodiments, the transceiver, in operation, receives the data according to the second control information.

In some embodiments, the transceiver, in operation, transmits the data according to the second control information.

In other words, the transceiver, in operation, may receive or transmit the data according to the second control information, depending on whether the second control information refers to reception or transmission of the data. The advantage achieved by the present disclosure is achieved by setting the monitoring period during which the PDCCH is monitored, regardless of whether the data is transmitted or received.

In some embodiments, the circuitry, in operation, initiates the monitoring period when the control information is received.

In some embodiments, the transceiver, in operation, receives a duration indicator indicating a duration of the monitoring period; and the circuitry, in operation, sets the duration of the monitoring period according to the duration indicated by the duration indicator.

In some embodiments, the circuitry, in operation, sets a duration of the monitoring period as proportional to the number of blind retransmissions.

In some embodiments, the transceiver, in operation, receives a retransmission indicator indicating the number of blind retransmission.

In some embodiments, the transceiver, in operation, receives a termination indicator indicating a termination of the monitoring period; and the circuitry, in operation, terminates the monitoring period when the termination indicator is received.

In some embodiments, the circuitry, in operation, sets the monitoring period by initiating a partial monitoring period each time control information or second control information is received.

In some embodiments, the transceiver, in operation, receives the data according to the control information or second control information; and the circuitry, in operation, decodes the data received according to the control information or the second control information; determines whether the data was decoded successfully or not; and sets the monitoring period by initiating a partial monitoring period each time the received data is not successfully decoded.

In some embodiments, the transceiver, in operation, receives a retransmission indicator indicating a number of retransmission; and the circuitry, in operation, does not initiate a partial monitoring period when a number of received second control information is equal to the indicated number of retransmissions.

In some embodiments, the transceiver, in operation, receives the data according to the control information or second control information, and the circuitry, in operation, decodes the data received by the transceiver; and terminates the monitoring period in a case where the data is successfully decoded.

In some embodiments, the circuitry, in operation, sets the monitoring period by initiating a timer with a runtime equal to a duration of the monitoring period.

In some embodiments, a discontinuous reception, DRX, cycle is configured, wherein the transceiver, in operation, monitors the PDCCH in active times and does not monitor the PDCCH in OFF periods.

Further provided is a scheduling device, comprising circuitry, which, in operation, determines a number of blind retransmissions of data; and a transceiver, which, in operation, transmits control information over a Physical Downlink Control Channel, PDCCH, the control information indicating a scheduled transmission or retransmission of the data according to the number of blind retransmission.

In some embodiments, the transceiver, in operation, receives the data according to the control information.

In some embodiments, the transceiver, in operation, transmits the data according to the control information.

In other words, the transceiver, in operation, may receive or transmit the data according to the control information, depending on whether the control information refers to reception or transmission of data. The advantage achieved by the present disclosure is achieved by setting the monitoring period during which the PDCCH is monitored, regardless of whether the data is transmitted or received.

In other words, the control information indicates scheduling of a transmission or blind retransmission of data. That is, the control information does not include said data but provides scheduling information for a transceiver device to receive the data or to transmit the data.

Further, a blind retransmission may be referred to as a transmission of the data previously transmitted. In particular, a blind retransmission is a retransmission of data without or regardless of feedback.

In some embodiments, the circuitry, in operation, determines a duration of a monitoring period; and the transceiver, in operation, transmits a duration indicator indicating the duration of the monitoring period.

In some embodiments, the transceiver, in operation, transmits a retransmission indicator indicating the number of retransmissions.

In some embodiments, the transceiver, in operation, transmits a termination indicator indicating a termination of the monitoring period.

Further provided is a method, comprising receiving control information over a Physical Downlink Control Channel, PDCCH, the control information indicating a scheduled transmission of data; and setting a monitoring period according to a number of blind retransmissions of the data, wherein the PDCCH is monitored during the monitoring period.

In some embodiments, the method comprises receiving the data according to the control information.

In some embodiments, the method comprises transmitting the data according to the control information.

In other words, the method may comprise receiving or transmitting the data according to the control information, depending on whether the control information refers to reception or transmission of data. The advantage achieved by the present disclosure is achieved by setting the monitoring period during which the PDCCH is monitored, regardless of whether the data is transmitted or received.

In other words, the control information indicates scheduling of a blind retransmission of data. That is, the control information does not include said data but provides scheduling information for a transceiver device to receive the data or to transmit the data.

Further, a blind retransmission may be referred to as a transmission of the data previously transmitted. In particular, a blind retransmission is a retransmission of data without or regardless of transmitted feedback.

In some embodiments, the method further comprises receiving second control information over the PDCCH within the monitoring period, the second control information indicating a scheduled retransmission of the data.

In some embodiments, the method comprises receiving the data according to the second control information.

In some embodiments, the method comprises transmitting the data according to the second control information.

In other words, the method may comprise receiving or transmitting the data according to the second control information, depending on whether the control information refers to reception or transmission of data. The advantage achieved by the present disclosure is achieved by setting the monitoring period during which the PDCCH is monitored, regardless of whether the data is transmitted or received.

In other words, the control information indicates scheduling of a blind retransmission of data. That is, the control information does not include said data but provides scheduling information for a transceiver device to receive the data or to transmit the data.

Further, a blind retransmission may be referred to as a transmission of the data previously transmitted. In particular, a blind retransmission is a retransmission of data without or regardless of received feedback.

In some embodiments, the method comprises initiating the monitoring period when the control information is received.

In some embodiments, the method comprises receiving a duration indicator indicating a duration of the monitoring period; and setting the duration of the monitoring period according to the duration indicated by the duration indicator.

In some embodiments, the method comprises setting a duration of the monitoring period as proportional to the number of blind retransmissions.

In some embodiments, the method comprises receiving a retransmission indicator indicating the number of blind retransmission.

In some embodiments, the method comprises receiving a termination indicator indicating a termination of the monitoring period; and terminating the monitoring period when the termination indicator is received.

In some embodiments, the method comprises setting the monitoring period by initiating a partial monitoring period each time control information or second control information is received.

In some embodiments, the method comprises receiving the data according to the control information or the second control information; decoding the data received according to the control information or second control information; determining whether the data was decoded successfully or not; and setting the monitoring period by initiating a partial monitoring period each time the received data is not successfully decoded.

In some embodiments, the method comprises receiving a retransmission indicator indicating a number of retransmission; and not initiating a partial monitoring period when a number of received second control information is equal to the indicated number of retransmissions.

In some embodiments, the method comprises receiving the data according to the control information or second control information; decoding the received data; and terminating the monitoring period in a case where the data is successfully decoded.

In some embodiments, the method comprises setting the monitoring period by initiating a timer with a runtime equal to a duration of the monitoring period.

In some embodiments, a discontinuous reception, DRX, cycle is configured, wherein the PDCCH in monitored in active times and the PDCCH is not monitored in OFF periods Further provided is a method, comprising determining a number of blind retransmissions of data; transmitting control information over a Physical Downlink Control Channel, PDCCH, the control information indicating a scheduled transmission or retransmission of the data according to the number of blind retransmission.

In some embodiments, the method comprises receiving the data according to the control information.

In some embodiments, the method comprises transmitting the data according to the control information.

In other words, the method may comprise receiving or transmitting the data according to the control information, depending on whether the control information refers to reception or transmission of data. The advantage achieved by the present disclosure is achieved by setting the monitoring period during which the PDCCH is monitored, regardless of whether the data is transmitted or received.

In other words, the control information indicates scheduling of a transmission or blind retransmission of data. That is, the control information does not include said data but provides scheduling information for a transceiver device to receive the data or to transmit the data.

Further, a blind retransmission may be referred to as a transmission of the data previously transmitted. In particular, a blind retransmission is a retransmission of data without or regardless of feedback.

In some embodiments, the method comprises determining a duration of a monitoring period; and transmitting a duration indicator indicating the duration of the monitoring period.

In some embodiments, the method comprises transmitting a retransmission indicator indicating the number of retransmissions.

In some embodiments, the method comprises transmitting a termination indicator indicating a termination of the monitoring period.

The invention claimed is:

1. A transceiver device, comprising
a transceiver, which, in operation, receives control information over a Physical Downlink Control Channel (PDCCH), the control information indicating a scheduled transmission of data and receives a configuration to disable or enable downlink Hybrid Automatic Repeat Request (HARQ) feedback via a radio resource control (RRC) message; and
circuitry, which, in operation, sets a monitoring period according to a number of-blind retransmissions of the data based on the configuration, wherein
the transceiver, in operation, monitors the PDCCH during the monitoring period.

2. The transceiver device according to claim 1, wherein the transceiver, in operation, receives second control information over the PDCCH within the monitoring period, the second control information indicating a scheduled retransmission of the data.

3. The transceiver device according to claim 1, wherein, the circuitry, in operation, initiates the monitoring period when the control information is received.

4. The transceiver device according to claim 1, wherein
the transceiver, in operation, receives a duration indicator indicating a duration of the monitoring period; and
the circuitry, in operation, sets the duration of the monitoring period according to the duration indicated by the duration indicator.

5. The transceiver device according to claim 1, wherein the circuitry, in operation, sets a duration of the monitoring period as proportional to the number of retransmissions.

6. The transceiver device according to claim 1, wherein the transceiver, in operation, receives a retransmission indicator indicating the number of retransmissions.

7. The transceiver device according to claim 1, wherein
the transceiver, in operation, receives a termination indicator indicating a termination of the monitoring period; and
the circuitry, in operation, terminates the monitoring period when the termination indicator is received.

8. The transceiver device according to claim 2, wherein the circuitry, in operation, sets the monitoring period by initiating a partial monitoring period each time control information or second control information is received.

9. The transceiver device according to claim 2, wherein
the transceiver, in operation, receives the data according to the control information or second control information; and
the circuitry, in operation,
decodes the data received according to the control information or the second control information;
determines whether the data was decoded successfully or not; and
sets the monitoring period by initiating a partial monitoring period each time the received data is not successfully decoded.

10. The transceiver device according to claim 8, wherein the transceiver, in operation, receives a retransmission indicator indicating a number of retransmissions; and
the circuitry, in operation, does not initiate a partial monitoring period when a number of received second control information is equal to the indicated number of retransmissions.

11. The transceiver according to claim 1, wherein
the transceiver, in operation, receives the data according to the control information or second control information; and
the circuitry, in operation,
decodes the data received by the transceiver; and
terminates the monitoring period in a case where the data is successfully decoded.

12. The transceiver according to claim 1, wherein the circuitry, in operation, sets the monitoring period by initiating a timer with a runtime equal to a duration of the monitoring period.

13. The transceiver device according to claim 1, wherein a discontinuous reception (DRX) cycle is configured, wherein the transceiver, in operation, monitors the PDCCH in active times and does not monitor the PDCCH in OFF periods.

14. A scheduling device, comprising
a transceiver, which, in operation,
transmits a configuration to disable or enable downlink Hybrid Automatic Repeat Request (HARQ) feedback via a radio resource control (RRC) message; and
transmits control information over a Physical Downlink Control Channel (PDCCH), the control information indicating a scheduled transmission of data, wherein a monitoring period according to a number of retransmissions of the data is set based on the configuration.

15. A method, comprising
receiving control information over a Physical Downlink Control Channel (PDCCH), the control information indicating a scheduled transmission of data;
receiving a configuration to disable or enable downlink Hybrid Automatic Repeat Request (HARQ) feedback via a radio resource control (RRC) message; and
setting a monitoring period according to a number of-blind retransmissions of the data;
based on the configuration, wherein
the PDCCH is monitored during the monitoring period.

* * * * *